United States Patent
Gould

(10) Patent No.: US 7,356,453 B2
(45) Date of Patent: Apr. 8, 2008

(54) COMPUTERIZED PATTERN TEXTURING

(75) Inventor: Dwayne Martin Gould, Hixson, TN (US)

(73) Assignee: Columbia Insurance Company, Omaha, NE (US)

( * ) Notice: Subject to any disclaimer, the term of this patent is extended or adjusted under 35 U.S.C. 154(b) by 622 days.

(21) Appl. No.: 10/293,845

(22) Filed: Nov. 13, 2002

(65) Prior Publication Data

US 2003/0091214 A1    May 15, 2003

Related U.S. Application Data

(60) Provisional application No. 60/332,995, filed on Nov. 14, 2001.

(51) Int. Cl.
*G06F 9/45* (2006.01)
(52) U.S. Cl. .......... 703/22; 345/582; 345/583; 345/584; 345/585; 345/586; 345/587; 345/588; 345/589
(58) Field of Classification Search ........... 345/581, 345/619, 642, 649, 660, 672, 582, 583–588; 703/1; 382/111
See application file for complete search history.

(56) References Cited

U.S. PATENT DOCUMENTS

| | | | |
|---|---|---|---|
| 4,531,120 A | 7/1985 | Brownell, Jr. et al. | |
| 5,016,183 A | 5/1991 | Shyong | |
| 5,459,819 A | 10/1995 | Watkins et al. | |
| 5,459,826 A | 10/1995 | Archibald | |
| 5,600,767 A | 2/1997 | Kakiyama et al. | |
| 5,638,499 A | 6/1997 | O'Connor et al. | |
| 5,649,032 A | 7/1997 | Burt et al. | |
| 5,748,200 A | 5/1998 | Funahashi | |
| 5,751,829 A | 5/1998 | Ringland et al. | |
| 5,850,463 A | 12/1998 | Horii | |
| 5,870,771 A | 2/1999 | Oberg | |
| 5,966,454 A * | 10/1999 | Thomas et al. ............. 382/111 |
| 5,986,671 A | 11/1999 | Fredlund et al. | |
| 6,151,421 A | 11/2000 | Yamada | |
| 6,392,659 B1 | 5/2002 | Ohki et al. | |
| 6,421,062 B1 | 7/2002 | Higashio | |

(Continued)

FOREIGN PATENT DOCUMENTS

WO    WO 03/093370 A2    11/2003

OTHER PUBLICATIONS

Booria Textile CAD/CAM Systems. Mar. 2001. p. 1.*

(Continued)

*Primary Examiner*—Kamini Shah
*Assistant Examiner*—Saif A Alhija
(74) *Attorney, Agent, or Firm*—Needle & Rosenberg, P.C.

(57) ABSTRACT

A system and method for merging carpet design image patterns in order to create a custom-designed patterned carpet image. A customized carpet image is defined by identifying a plurality of carpet design fields within a carpet and selecting a distinct design pattern from a plurality of selection options for each identified carpet design field in order to define a customized design field pattern. The customized design field pattern comprises the selected design pattern. Merging the customized design field patterns together defines an image of a custom-designed carpet. Further, a strike-off of the image of the custom-designed carpet image can be produced from the system and method.

28 Claims, 24 Drawing Sheets

U.S. PATENT DOCUMENTS

| | | |
|---|---|---|
| 6,433,783 B2 | 8/2002 | Murata |
| 6,459,435 B1 * | 10/2002 | Eichel .................. 345/588 |
| 6,535,650 B1 | 3/2003 | Poulo et al. |
| 6,556,210 B1 | 4/2003 | Yamamoto et al. |
| 6,664,972 B2 * | 12/2003 | Eichel et al. ............ 345/582 |
| 6,665,451 B1 | 12/2003 | Kusama et al. |
| 6,720,971 B1 | 4/2004 | Yamamoto et al. |
| 6,724,946 B1 | 4/2004 | Kusama et al. |
| 6,911,245 B2 * | 6/2005 | Beistline et al. ............ 428/89 |
| 7,070,846 B2 * | 7/2006 | Beistline et al. ............ 428/88 |
| 2001/0022860 A1 | 9/2001 | Kitamura et al. |
| 2002/0041717 A1 | 4/2002 | Murata et al. |
| 2002/0123941 A1 | 9/2002 | Donahue et al. |
| 2002/0123942 A1 | 9/2002 | Bridges, Jr. et al. |
| 2002/0126914 A1 | 9/2002 | Kotake et al. |
| 2002/0133430 A1 | 9/2002 | Coomber et al. |
| 2002/0175942 A1 | 11/2002 | Seitz, Jr. |
| 2003/0016235 A1 | 1/2003 | Odagawa |
| 2003/0113035 A1 | 6/2003 | Cahill et al. |
| 2003/0146921 A1 | 8/2003 | Taniguchi et al. |
| 2003/0215127 A1 | 11/2003 | Stem et al. |
| 2004/0022453 A1 | 2/2004 | Kusama et al. |
| 2004/0030733 A1 | 2/2004 | Bell |
| 2004/0034576 A1 | 2/2004 | Jones et al. |

OTHER PUBLICATIONS

Textronics CAD/CAM for Woven, Knotted, and Tufted Carpets. Apr. 2004. pp. 1-4.*

Textronics CAD/CAM for Woven, Knotted, and Tufted Carpets. Apr. 2004. pp. 1-2.*

Wilcom-Tecos. MIRA Designer 2000. pp. 1-2.*

* cited by examiner

```
Option Explicit                                    'Forces declaration of all variables
Private Declare Function BitBlt Lib "gdi32" (ByVal hDestDC As Long, ByVal X As Long, ByVal Y As Long, ByVal Nwidth
As Long, ByVal Nheight As Long, ByVal hSrcDC As Long, ByVal xSrc As Long, ByVal ySrc As Long, ByVal dwRop As
Long) As Long                                       'API for placement of patterns Private Sub cmdMerge_Click()

Dim dpi As Integer, boamt As Integer, bow As Integer, boh As Integer
Dim cw As Integer, ch As Integer, bw As Integer, bh As Integer, fw As Integer, fh As Integer
Dim c As Integer, r As Integer, i As Integer, j As Integer dpi = 16                              'Dots per Inch: Vaiable based on image requirements and scale
boamt = 9 * dpi                       'Amount of Bleedout Shown ex.: 9 inches x dpi : Variable based on user
                                       preference
bow = Pic(0).Width: boh = Pic(0).Height    'Bleedout width and height: Variable based on pattern selected
cw = Pic(1).Width: ch = Pic(1).Height      'Corner width and height: Variable based on corner selected
bw = Pic(2).Width: bh = Pic(2).Height      'Border width and height: Variable based on border selected
fw = Pic(3).Width: fh = Pic(3).Height      'Field width and height: Variable based on pattern selected
c = PD.Width / bow: r = PD.Height / boh    'Number of columns and rows for Bleedout: Variable based on pattern
                                            selected
                                           'Bleedout tiling.
For i = 0 To r + 1
```

Figure 5B

```
For j = 0 To c + 1: BitBlt PD.hDC, i * bow, j * boh, bow, boh, Pic(0).hDC, 0, 0, vbSrcCopy: Next
Next BitBlt PD.hDC, boamt, boamt, cw, ch, Pic(1).hDC, 0, 0, vbSrcCopy    'Corner placement : Variable based on Amount
                                                                    of Bleedout Shown.

c = (PD.Width - (boamt + cw)) / bw: r = (PD.Height - (boamt + ch)) / bw   'Number of cols and rows for Border: Variable
                                                                          based on Amount of Bleedout, corner and
                                                                          border selected For j = 0 To c + 1: BitBlt PD.hDC, boamt + cw + (j * bw), boamt, bw, bh, Pic(2).hDC, 0, 0, vbSrcCopy: Next
                                                                                        'Tiling for Horizontal Border.
For j = 0 To r + 1: BitBlt PD.hDC, boamt, boamt + ch + (i * bw), bh, bw, Pic(4).hDC, 0, 0, vbSrcCopy: Next
                                                                                        'Tiling for Vertical Border.

c = (PD.Width - (boamt + cw)) / fw: r = (PD.Height - (boamt + ch)) / fh   'Number of cols and rows for Field: Variable
                                                                          based on Amount of Bleedout, corner, border
                                                                          and field selected
                                                                          'Tiling for Field.
For i = 0 To r + 1
For j = 0 To c + 1: BitBlt PD.hDC, boamt + cw + (i * fw), boamt + ch + (j * fh), fw, fh, Pic(3).hDC, 0, 0, vbSrcCopy: Next
Next
PD.Refresh
End Sub
```

Figure 5C

COMPUTERIZED PATTERN TEXTURING

CROSS-REFERENCE TO RELATED PATENT APPLICATION

The benefit is claimed of provisional U.S. Patent Application Ser. No. 60/332,995, filed Nov. 14, 2001, entitled "COMPUTERIZED PATTERN TEXTURING," the specification of which is incorporated herein in its entirety by this reference.

BACKGROUND

The carpet or rug selected for placement within a commercial setting is very important. Typically, the use of a carpet or rug that contains custom colors and design patterns helps to enhance the mood or tone of the space in which it is present.

Conventionally, carpets or rugs used in hospitality industries, such as hotels, restaurants and the like are limited by the design processes used to determine the color and styles of the carpets and rugs used within the commercial settings of such mentioned industries.

Conventionally, the typical merging of design patterns used to create customized carpets involves a process in which a designer uses a commercial graphics program to assemble each design element pattern into an electronic image of a carpet sample. These electronic images serve as templates in the creation of carpet or rug strike-offs, or samples, wherein the sample will embody the created custom designed image. A strike-off can take various forms, including that of an electronic image, a paper printout or an actual carpet sample.

The output of carpet custom design imaging processes is further used in the production of full size custom-designed patterned carpets or rugs based on the custom-designed pattern. Various techniques can be utilized to create custom-designed carpet patterns, including piece dyeing and ink-jet printing. Piece dyeing comprises a carpet coloring technique wherein color is applied to a carpet or rug after the completion of a tufting procedure. Ink-jet printing is a carpet or rug coloring technique wherein color is applied to a carpet or rug via an ink-jet dye system in order to create a multi-colored pattern.

The conventional customization process manually places each component of the carpet design pattern in its respective position. Further, before the conventional manual customization process can be accomplished, the color palettes of each design pattern must be matched before electronic merging of the customized design patterns is successful. The alignment of incorrect color positions is critical to the designing of a customized carpet, due in part to the fact that a limited number of colors are used in the carpet production process. This process is both time consuming and can be inaccurate due to the manual placement of the design patterns. Additionally, the software used for this process is expensive, thus leaving the customizing tasks to be accomplished only at a manufacturing facility utilizing skilled designers.

Therefore, there exists a need for a time efficient and economically efficient way to create a customized carpet design.

SUMMARY

The present invention relates to a method, system and a computer program product for developing and merging electronic carpet images, including custom carpet design field patterns, into different configurations for custom-designed carpet applications. The custom-designed carpet images are used as templates in the production of custom-designed carpets. Carpets that are customized with the use of these custom carpet patterns can be produced by any number of well known carpet colorizing methods, including dye injection printing, flat bed printing, computerized tufted carpet, axminster and jacquard woven carpet methods.

One embodiment of the present invention relates to a method that comprises the steps of identifying a plurality of carpet design fields within a carpet and selecting a distinct design pattern from a plurality of selection options for each identified carpet design field in order to define a customized design field pattern. The customized design field pattern is composed of the selected design pattern. Further, the method allows for the merging of customized design field patterns together in order to define an image of a custom-designed carpet. A strike-off of the image of the custom-designed carpet image is created from the custom-designed carpet image.

A further embodiment of the present invention relates to a computer system for the creation of custom-designed patterned carpet images. The computer system includes a processing system that has one or more processing elements, wherein the processing elements are programmed or adapted to identify a plurality of carpet design fields within a carpet and select a distinct design pattern from a plurality of selection options for each identified carpet design field to define a customized design field pattern. Further, the processing element(s) facilitate the merging of the customized design field patterns together to define a custom-designed carpet and to create a strike-off of the custom-designed carpet.

A yet further embodiment of the present invention relates to a computer program product for creating of custom-designed patterned carpet images. The computer program product includes a computer-usable medium carrying thereon a means for identifying a plurality of carpet design fields within a carpet and a selection means for selecting a distinct design pattern from a plurality of selection options for each identified carpet design field in order to define a customized design field pattern, wherein the customized design field pattern comprises the selected design pattern. In addition, the computer program product includes a means for merging the customized design field patterns together in order to define an image of a custom-designed carpet and a strike-off generating means for creating a strike-off of the image of the custom-designed carpet image.

DETAILED DESCRIPTIONS OF THE DRAWINGS

The accompanying drawings, which are incorporated in and constitute a part of this specification, illustrate embodiments of the invention, and together with the description, serve to explain the principles of the invention.

FIG. 5B illustrates an example of psuedocode that may be used to implement the rendering functions that relate to the present invention.

FIG. 5C is a continuation of FIG. 5B.

DETAILED DESCRIPTION

Embodiments of the invention are described below in detail. The disclosed embodiments are intended to be illustrative only, since numerous modifications and variations therein will be apparent to those of ordinary skill in the art. In reference to the drawings, like numbers will indicate like parts continuously throughout the views. As used in the description herein and throughout the claims that follow, the meaning of "a," "an," and "the" include plural references also, unless the context of use clearly dictates otherwise. Additionally, the meaning of "in" includes "in" and "on" unless the context clearly dictates otherwise as the term is used in the description herein and throughout the claims that follow.

The present invention relates to a method, system and a computer program product for developing and merging electronic carpet images, including custom carpet design field patterns, into different configurations for custom-designed carpet applications. The electronic image output of the present invention can be implemented in the production processes that are associated with the creation and manufacture of custom-designed carpets or rugs. The electronic images produced by the present invention can also be used to create detailed installation diagrams for the installation of custom-patterned carpets that are created according to the visual and dimensional specifications that are provided by a system user.

Figure 1:
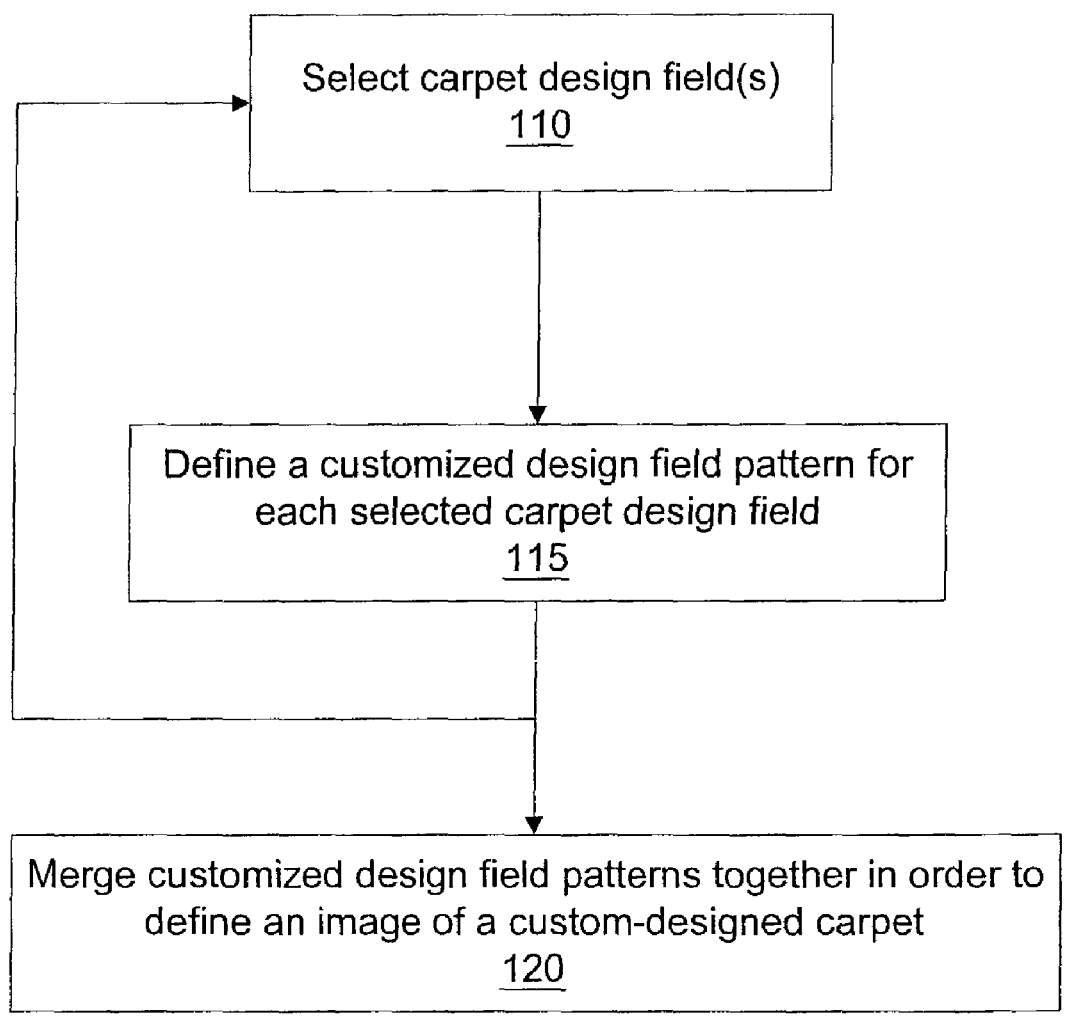
FIG. 1 is a flow diagram of a method for creating a customized carpet image.

As illustrated in FIG. 1, a flow diagram describes the general, or high-level, method for creating a custom-designed carpet. At step 110, a carpet design field of a carpet that is to be customized is selected. A design pattern is then chosen from a listing of design patterns for the selected design field of the carpet at step 115, thus defining a customized design field pattern for the selected design field. Step 110 and 115 can be repeated for any number of fields, as indicated by the arrow from step 115 to step 110. Finally, at step 120, the selected customized design field patterns are merged together in order to define a custom-designed carpet.

Figure 2:
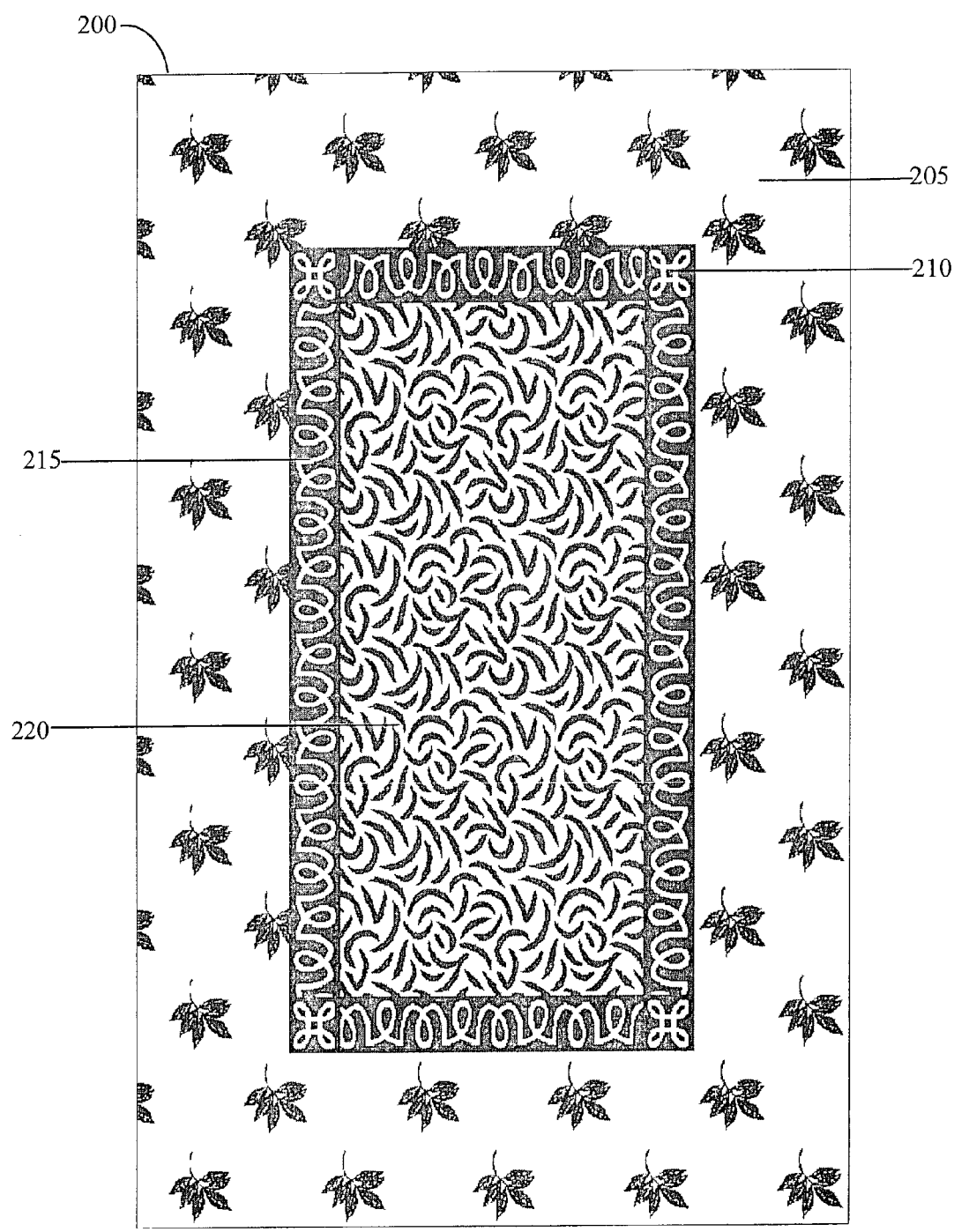
FIG. 2 is a diagram illustrating a customized rug layout and the carpet design fields contained therein.
Figure 12:
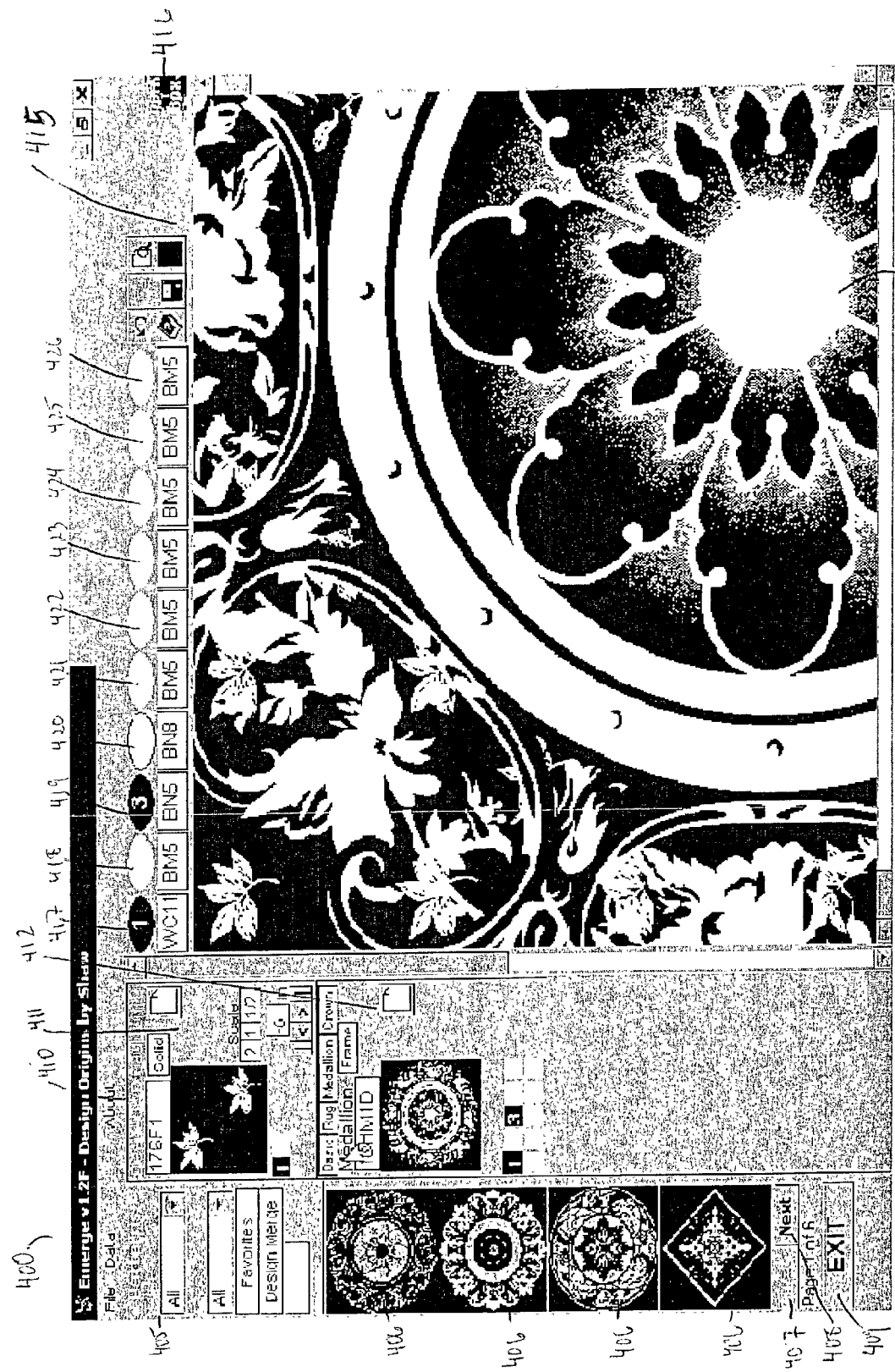
FIG. 12 illustrates a medallion carpet design field.
Figure 13:
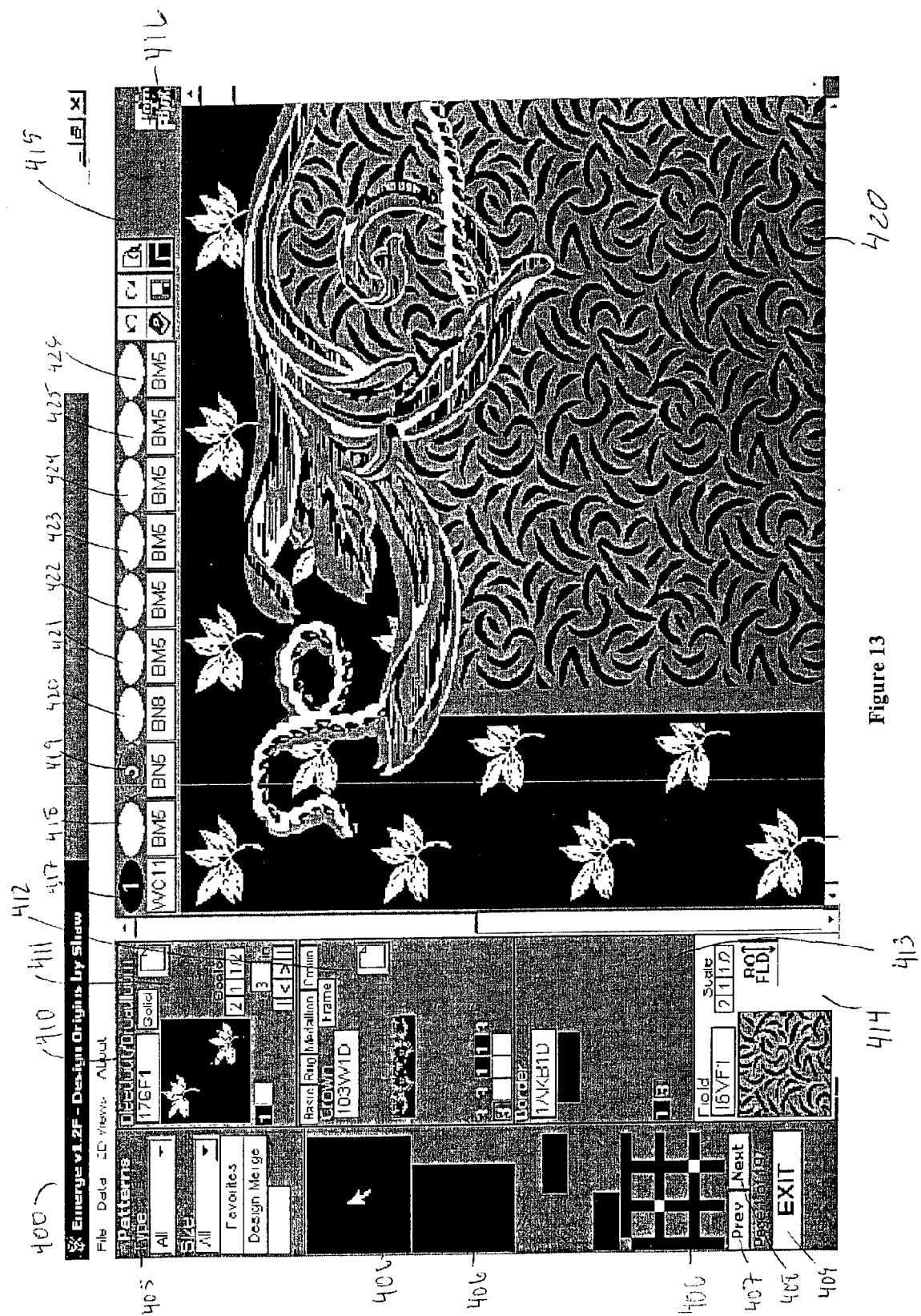
FIG. 13 illustrates a crown carpet design field.
Figure 14:
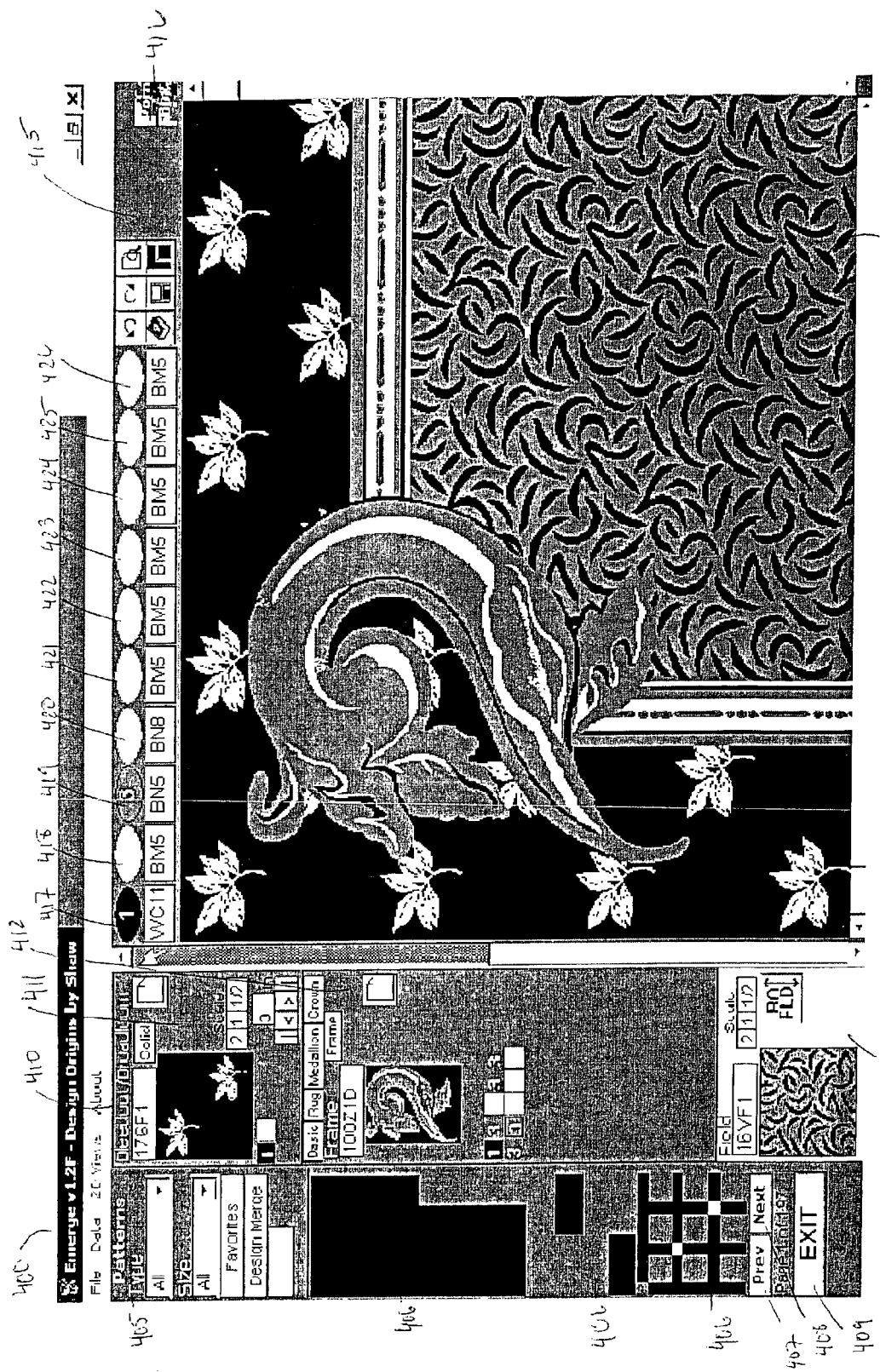
FIG. 14 illustrates a frame carpet design field.

As persons of ordinary skill in the art to which the invention relates understand, a carpet or rug of the type to which the invention relates includes several distinct design fields. For example, as illustrated in FIG. 2, carpets or rugs used in the lobbies of restaurants or hotels and other such commercial environments typically include at least the following fields: a bleedout design field 205, a corner design field 210, a border design field 215 and a field design field 220. The bleedout carpet design field 205 is defined as the area between the printed carpet and a wall. The corner carpet design field 210 is used in conjunction with the border carpet design field 215 to define the area of the carpet 200. The border carpet design field 215 can be used in conjunction with the corner carpet design field 210 or may be mitered to define the area of the carpet 200. The field carpet design field 220 is the area inside of the border carpet design field 215 of the carpet 200. A broadloom carpet design field (not shown) may also be used as a defining design field of a carpet. The broadloom carpet design field is a single pattern field that is used to fill an entire area of a carpet. Additional carpet design fields are shown in FIGS. 12, 13 and 14, wherein the figures display a medallion, crown and frame carpet design field image, respectively.

Figure 3:
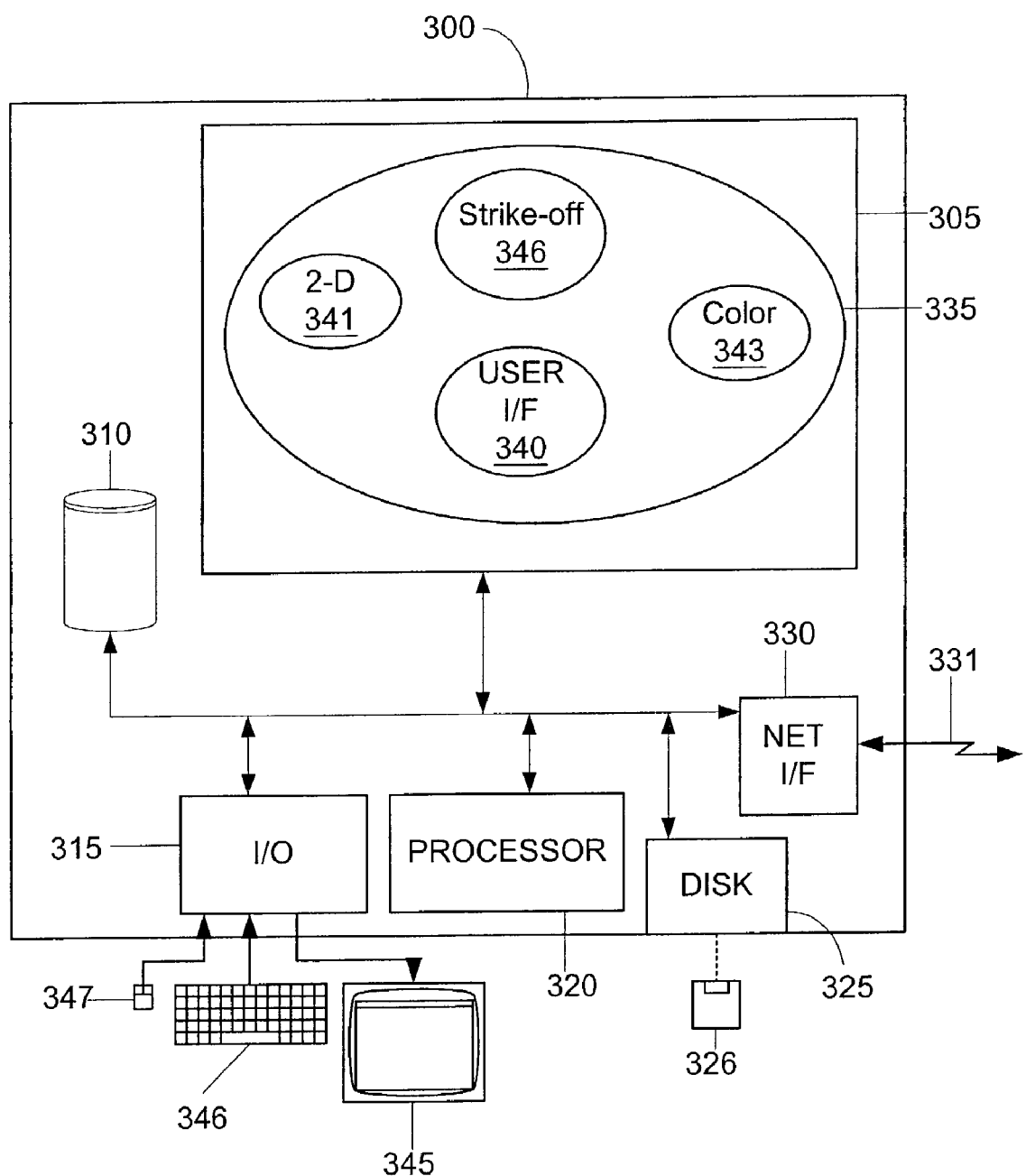
FIG. 3 is a diagram illustrating a computer system embodiment for the present invention.

FIG. 3 illustrates an exemplary embodiment of the present invention that relates to a computer system. A system user (not shown) is provided with a computer or computer system 300 on which a carpet customization software product 335 is operating. The computer system 300 operated by the user can be a conventional personal computer. The carpet customization software product 335 includes a graphical user interface (GUI) 340 that operates in accordance with conventional windowing paradigms. The software product further includes a two-dimensional image generator 341, a strike-off generator 342 and color selector palette generator 343.

To interface with the user, the computer system 300 includes a mouse 347, a keyboard 346 and a display device 345. Nevertheless, in other embodiments of the present invention the user interface can include any other suitable hardware devices and software. The computer system 300 also includes other hardware and software elements of the types generally included in conventional personal computers, such as a processor 320, a disk storage device 310 such as a hard disk drive, input/output interfaces 315, a network interface 330, and a removable read/write storage device 325 such as a drive that uses a CD-ROM or a floppy disk 326.

The software elements of the programmed computer are shown for purposes of clarity and illustration as executable in a main memory 305, but as persons skilled in the art understand they may not in actuality reside simultaneously or in their entireties in memory 305. The computer has other hardware and software elements of the types conventionally included in personal computers, such as an operating system, but these are not shown for purposes of clarity. Note that software elements can be loaded into the computer from another source via network 331, a disk 326 or any other similar media. Similarly, such software elements can be transferred from the computer to another destination via disk 326, network 331 or similar media.

Figure 4:
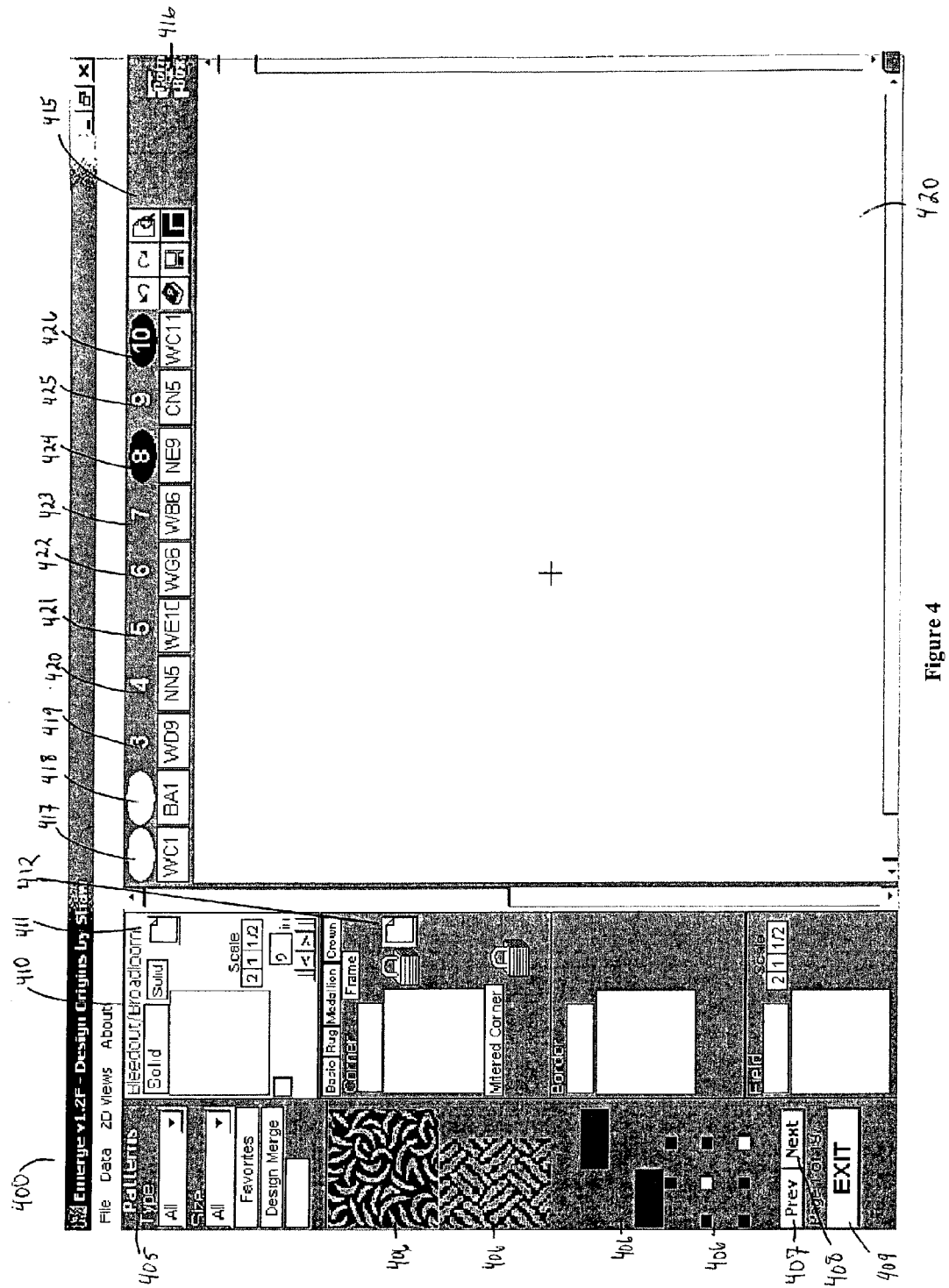
FIG. 4 illustrates the general layout of a graphical user interface (GUI) of an embodiment of the present invention.

FIG. 4 is a screen display 400 that can be generated by GUI 340 in embodiments of the present invention. Screen display 400 allows a user to interact with the GUI 340 using typical interaction conventions such as selecting displayed items with an input device (for example, a mouse 347). Screen display 400 includes areas 405 and 410 for displaying and selecting carpet design patterns 406 and carpet design fields, respectively.

The carpet design field display area 410 has image areas for selecting predetermined carpet design fields (for example, in this instance, bleedout/broadloom 411, corner 412, border 413 and field 414 design field image areas). Screen display 400 further includes a color selection display area 415 that includes selected color display areas 417-426.

An image rendering area 420 is also provided, wherein the image rendering area 420 displays all work in progress during the selection and implementation of a carpet custom-designing process. The design patterns 406 available within the system are displayed in a design pattern display area 405. The design pattern display area 405 includes activation buttons (407, 408) that allow a user to browse forwards or backwards through displayed thumbnail images of available design patterns. The design pattern display are 405 also includes an exit button 409, wherein the exit button allows a user to exit the viewing of the currently displayed design patterns 406 The bleedout/broadloom 411 and field 414 design field image areas have user input areas wherein a user can specify the image scale that will be used to render the selected image pattern. Accordingly a scale value of one is representative of the true image size of a selected pattern, whereas the value can be multiplied or diminished by additional scaling factors.

The corner design field selection area 412 presents a user with the option of substituting a corner design field with that of a medallion, crown rug or frame design field, examples of which are illustrated in FIGS. 12, 13 and 14, respectively. Further, the corner design field selection area presents 412 a user with the option of creating a corner design field that is composed of mitered border corners.

Figure 5:
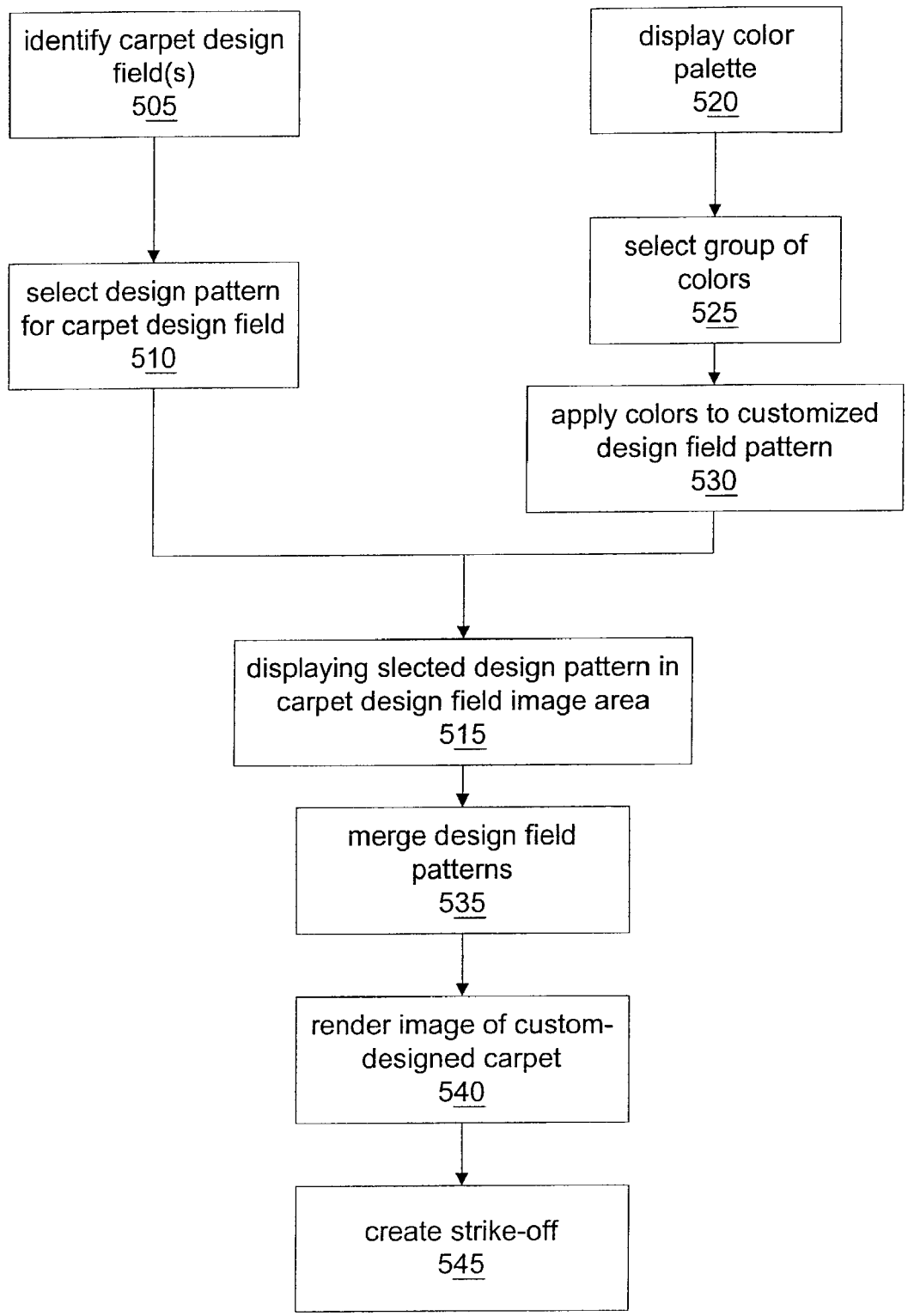
FIGS. 5 and 5A are flow diagrams illustrating methods for defining a custom-designed carpet.

An exemplary method for creating of a custom-designed carpet is presented in FIG. 5 and described in reference to FIGS. 4, 6, 6A, 6B, 7, 7A, 8 and 9. At step 505 a system user identifies the carpet design field image area that the user desires to customize. As described above, the design patterns 406 available within the system are displayed in a design pattern display area 405. Returning to FIG. 5, at step 510, the user selects a design pattern with which to customize the selected carpet design field 410. At step 515, the selected design pattern is displayed in the selected carpet design field area 410 that is associated with the selected carpet design field (reference Nos. 411-414).

At step 520 a color selection palette 415 is displayed to the user. The colors displayed in the color selection palette are user selected and are utilized by the system to provide color to the custom-designed carpet. At step 525 the user can select colors from a color palette 421 that is accessed via the pom box button 416 located within the color selection palette field 415. The term "pom box" refers to the conventional means for physically displaying a color palette, wherein the button 416 is referred to as a pom box button since it performs an analogous function within the system. The user-selected colors are displayed in color selection display areas 417-426 and thus commonly define the project palette of the current carpet design. The selected colors are applied to the customized carpet design field pattern at step 530.

The customized design field pattern is merged with any additional customized design field patterns at step 535 and rendered within the image rendering area 420 of the screen display 400 at step 540. Any suitable image rendering method can be used to render the image, but an exemplary rendering method is described in detail below. Finally, if desired, a strike-off image (either electronic or hard-copy) is created of the customized carpet image at step 545.

Figure 5A:
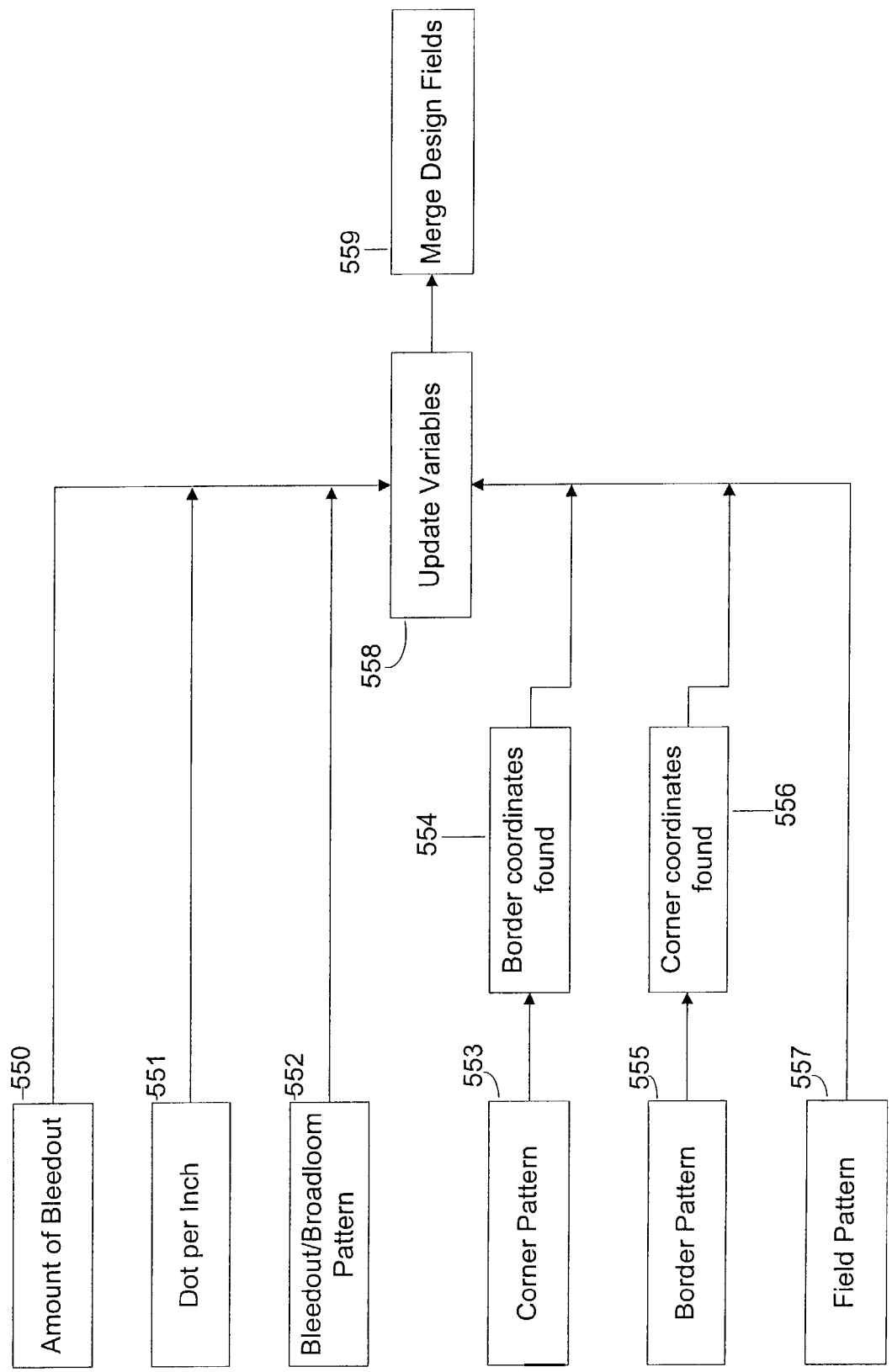

FIG. 5A shows a flowchart illustrating the basic functions that relate to the present invention. As will be apparent from the following description, the steps 550, 551, 552, 553, 555 and 557, in which input is received from a user, can be performed in any order. FIGS. 5B and 5C show example of software psuedocode that relates to the present invention.

At steps 550 and 551 the user enters the variable amounts into the system in regard to the image rendering resolution or dots-per-inch (dpi), and the amount of bleedout that is displayed within the carpet, respectively. Dpi directly correlates to the resolution of a displayed image, therefore, the higher the pixel resolution of an image, the more rows and columns of pixels are contained therein. The dpi used within the present system is a variable that is based upon the image requirements for rendering and the selected image rendering scale. Further, the amount of bleedout to be displayed is calculated by multiplying 9*dpi.

Figure 6:
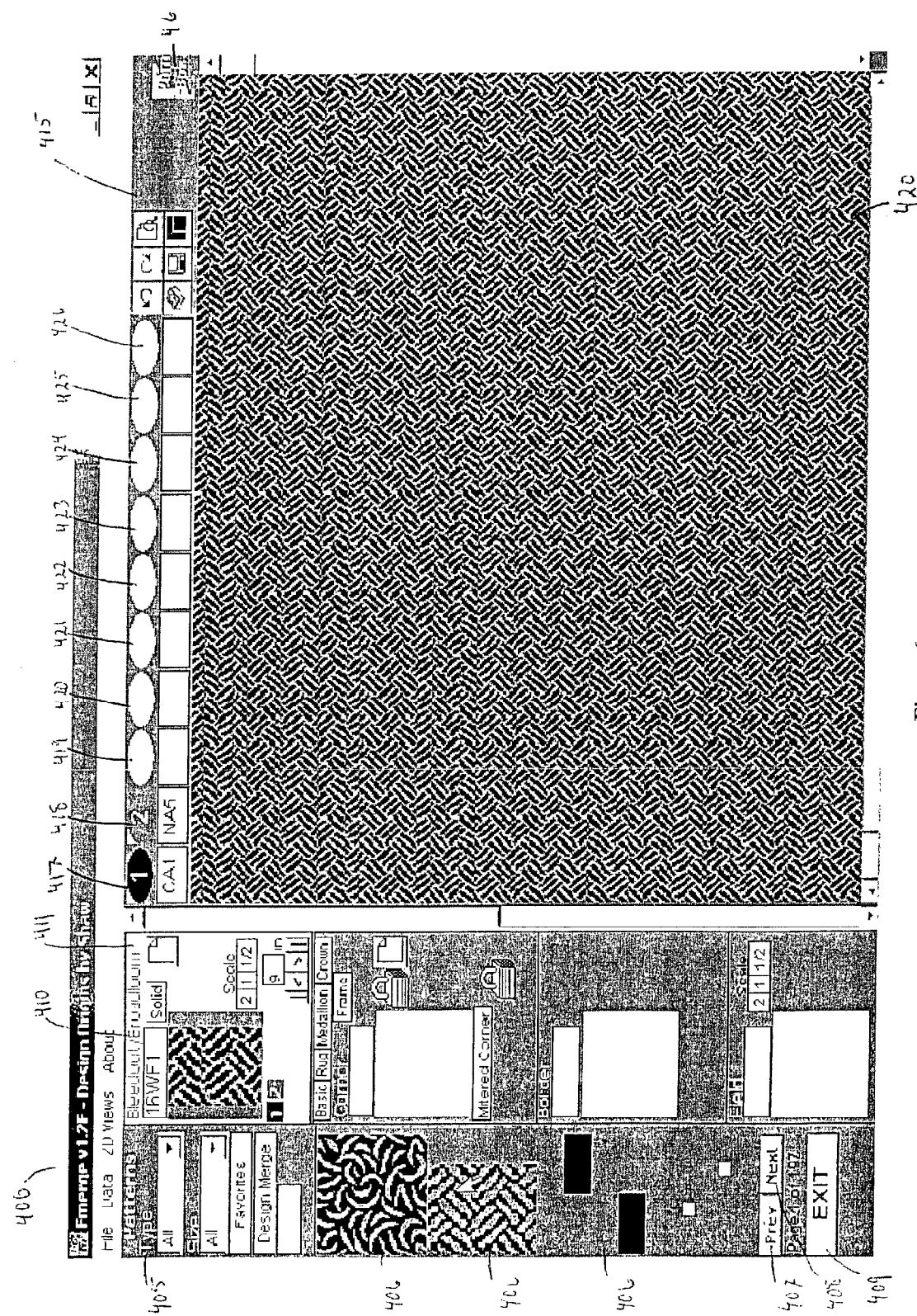
FIGS. 6 and 6A illustrate selecting a bleedout design pattern using the GUI.
Figure 6A:
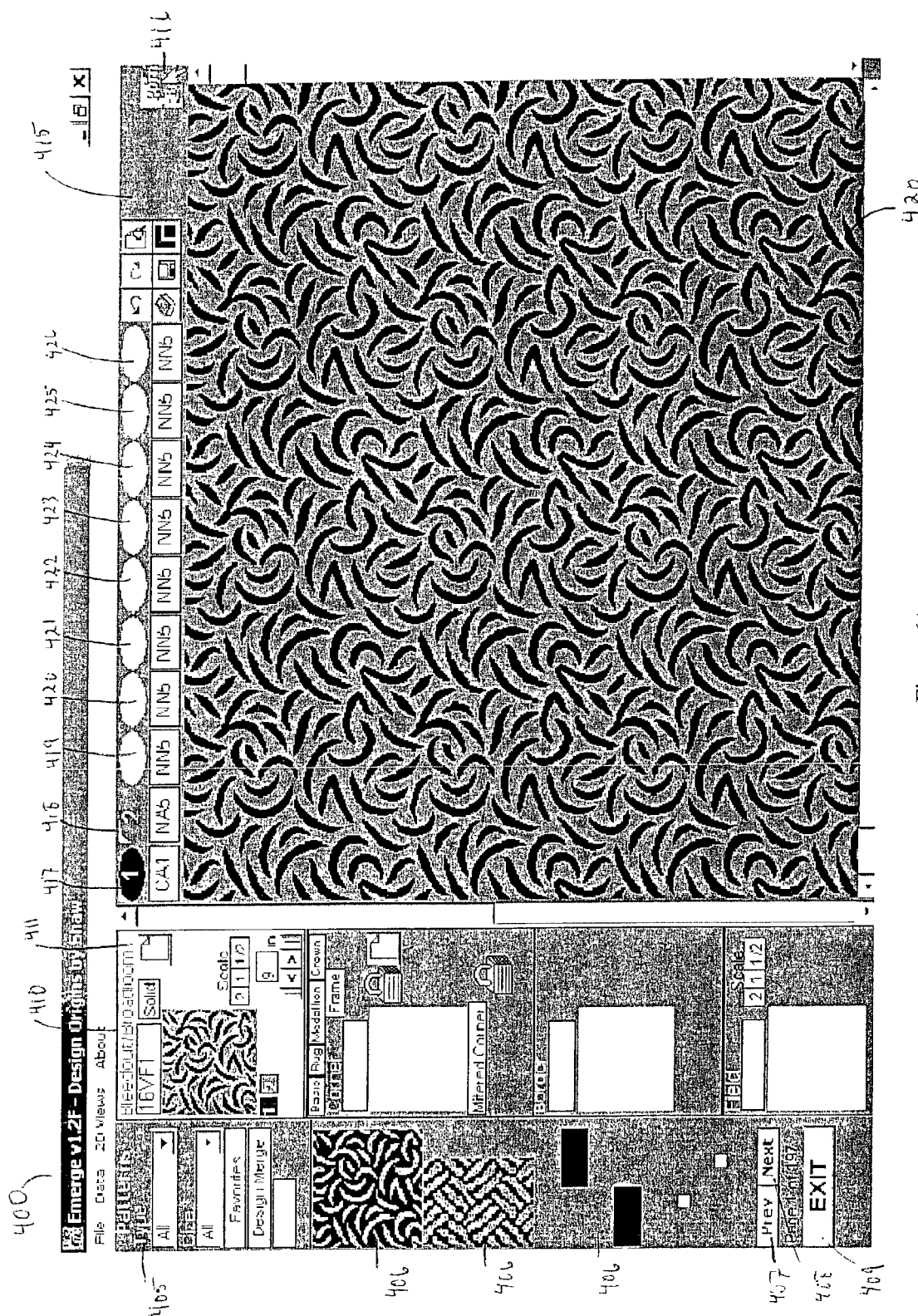
Figure 6B:
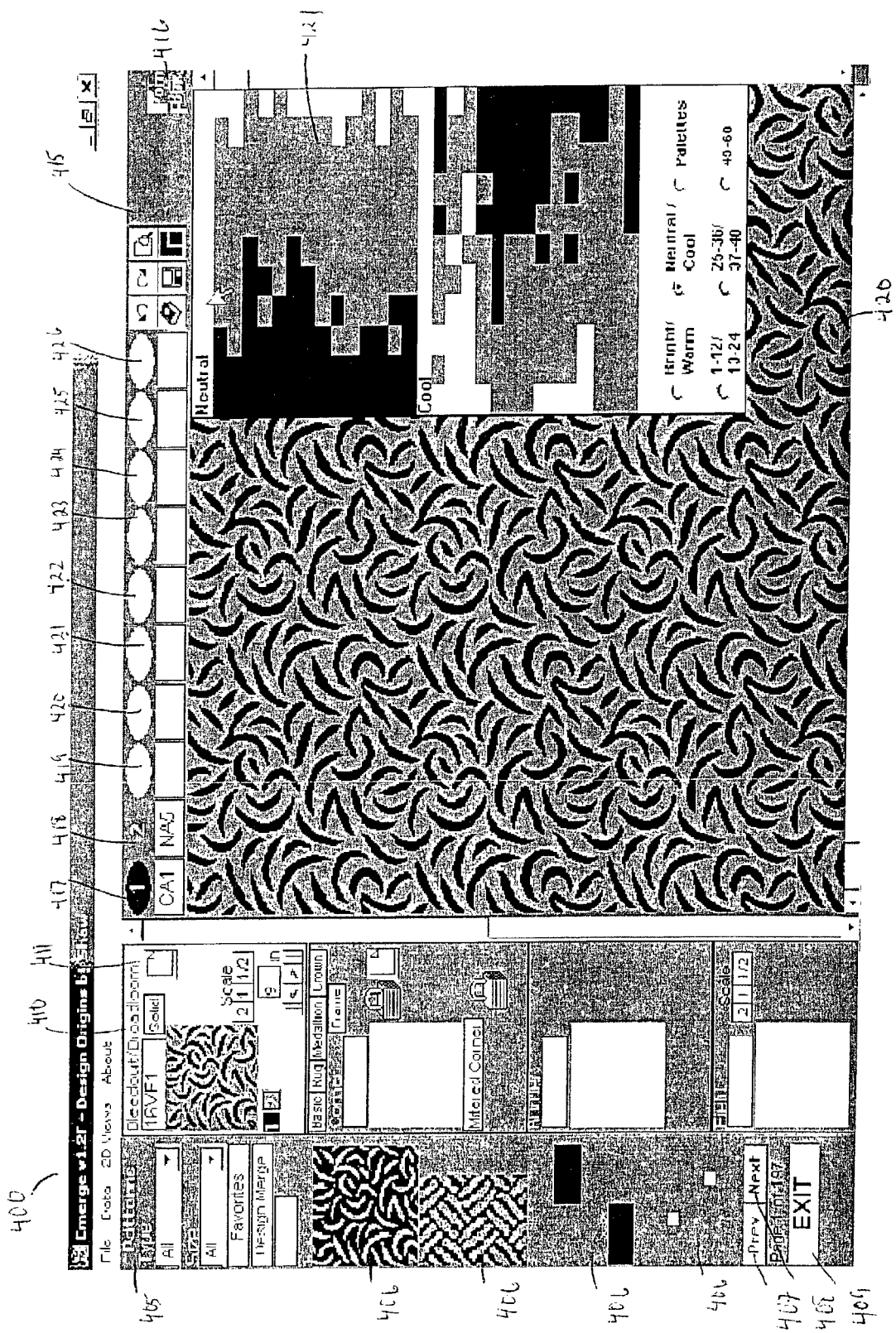
FIG. 6B illustrates a color selection palette used to select colors for use by the present invention.

At step 552, a bleedout or broadloom pattern is selected by the user to be customized. As shown in FIGS. 6, 6A and 6B, the carpet custom-design process is initiated by the user selecting from the carpet design field image area 410 a carpet design field that is to be customized, in this instance the bleedout carpet design field image area 411 is selected. The user browses the thumbnail design pattern images 406 in the design pattern field 405, until the user finds a pattern that the user wants to use in the carpet design. The user then selects the pattern and thereafter the selected design pattern becomes the current pattern of the selected carpet design field image area 411, and the pattern is displayed in the carpet design field image area 410 of the bleedout carpet design field image area 411. The color palette of the selected carpet design pattern displayed within the carpet design field image area 411 is changed to reflect the colors of the current project palette 417-426.

The pattern image sizes are retrieved for the selected pattern. Then the number of image display columns is calculated by dividing the rendering image width by the bleedout image width, and one is added to this quantity to compensate for integer calculation. The number of image display rows is calculated by dividing the rendering image height by the bleedout carpet design field image height and one is added to this quantity to compensate for integer calculation. The image featuring the selected bleedout pattern is rendered in the image rendering area 420 by using a for-next loop for the number of calculated columns and a for-next loop inside of the column for-next loop for the number of calculated rows. (See FIGS. 5B-C).

At step 558, all of the variables are updated and at step 559 the processed image is refreshed to reflect any changes and displayed in the image rendering area 420. If the bleedout scaling factor is other than one, then the actual image sizes are retrieved for the bleedout carpet design field pattern width and height, and each of these values are multiplied by the bleedout carpet design field scale value. The number of display columns is calculated by dividing the rendering image width by the scaled bleedout carpet design field image width, and one is added to this quantity to compensate for integer calculation. The number of rows is calculated by dividing the rendering image height by the scaled bleedout carpet design field image height, and one is added to this quantity to compensate for integer calculation. The image is then scaled and rendered in the image rendering area 420 by using a for-next loop for the number of calculated columns and a for-next loop inside of the column for-next loop for the number of calculated rows. (See FIGS. 5B-C). At step 558, all of the variables used within the calculations are updated and the processed image is refreshed to reflect the changes, and at step 559 the image is displayed in the image rendering area 420.

Figure 7:
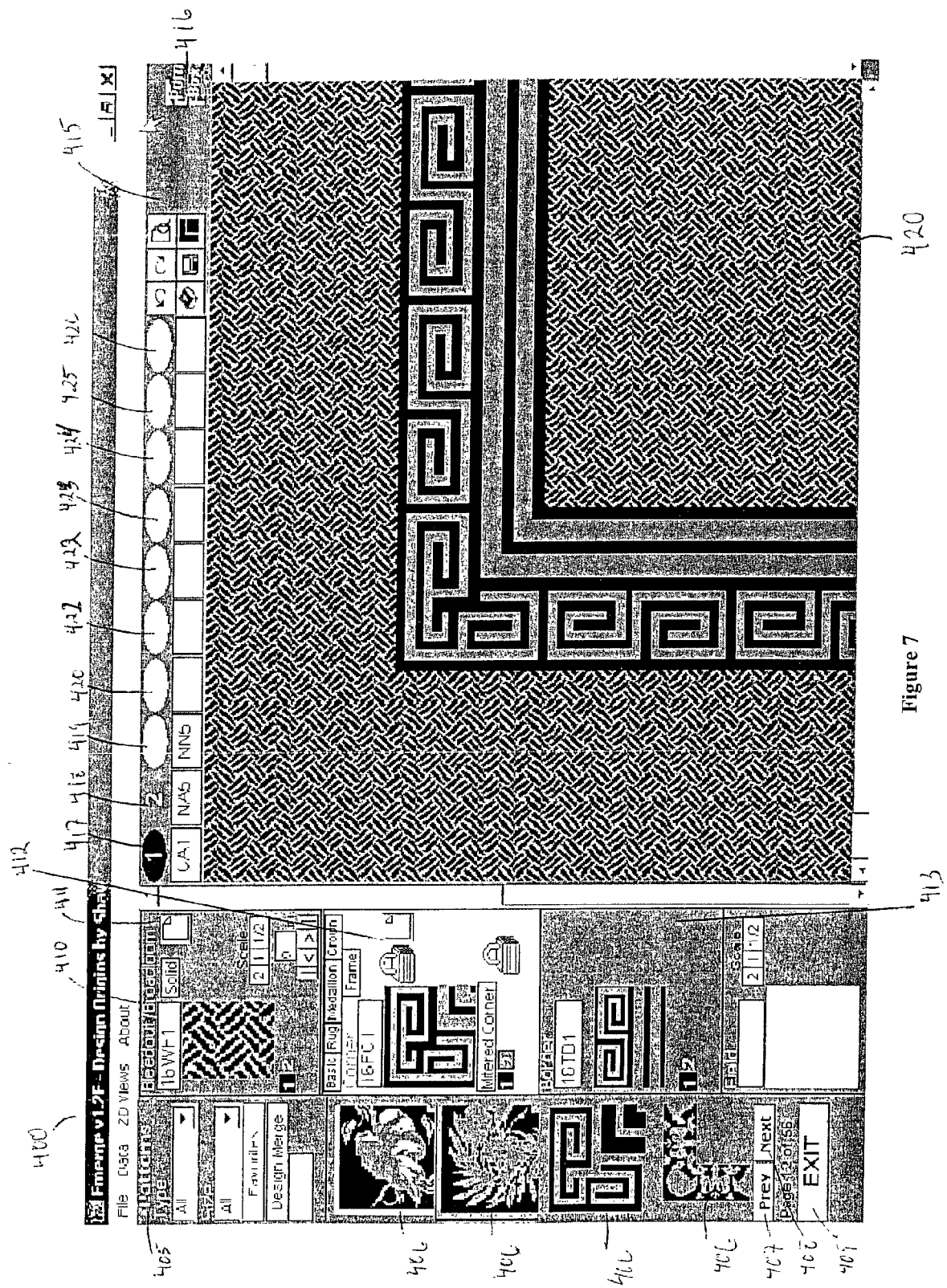
FIGS. 7 and 7A illustrate selecting a corner and border design pattern using the GUI.
Figure 7A:
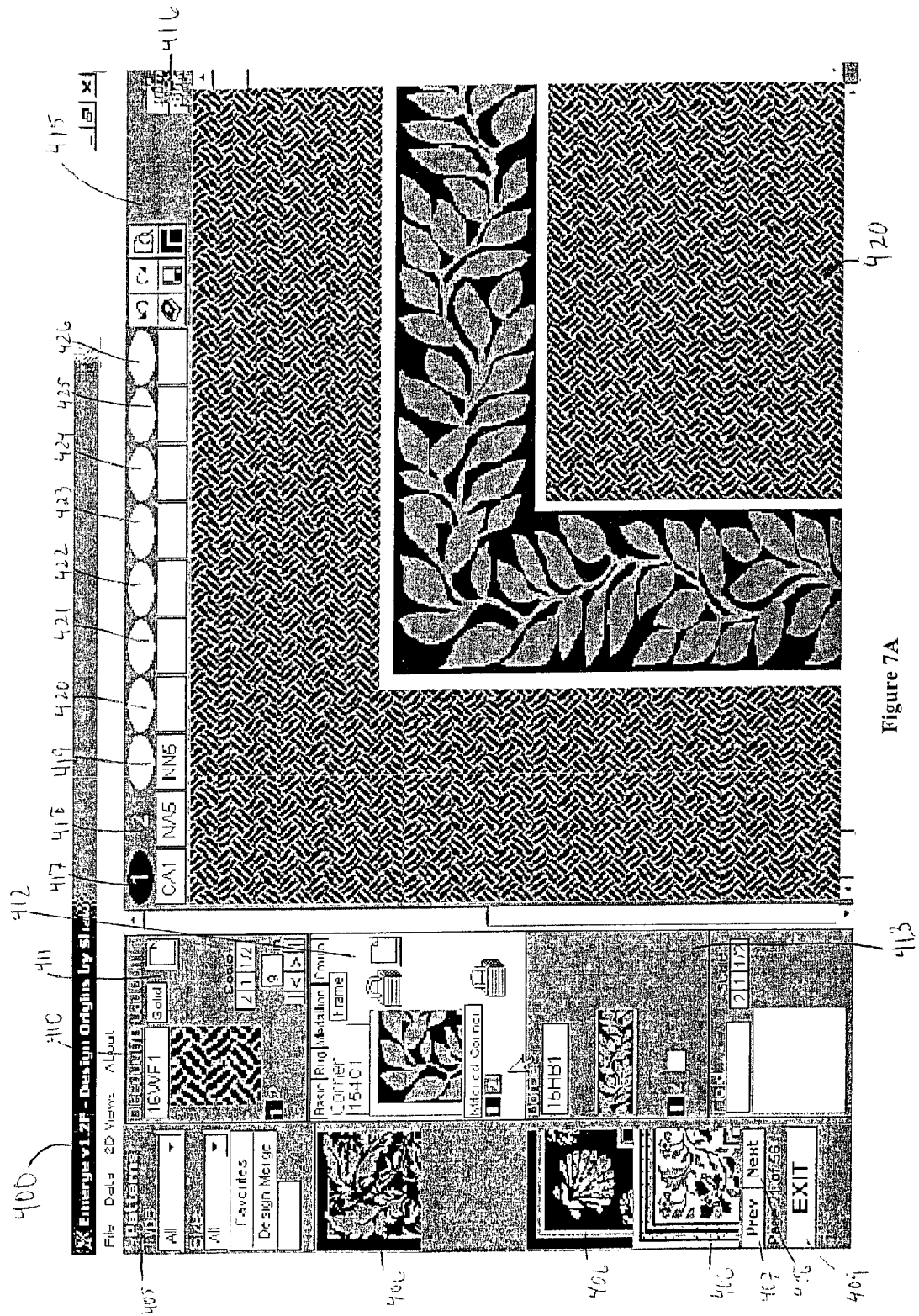

A corner pattern and border pattern are selected at steps 553 and 554, respectively. FIGS. 7 and 7A show a screen display 400 wherein the user has selected a corner and border for a custom-designed carpet for customization. The selected design pattern is displayed in the carpet design field image area 410. The actual size of the selected image pattern is retrieved and the number of image display columns is calculated by dividing the rendering image width by the bleedout carpet design field image width, and one is added to this quantity to compensate for integer calculation. The number of rows is calculated by dividing the rendering image height by the bleedout carpet design field image height and one is added to this quantity to compensate for integer calculation. (See FIGS. 5B-C).

The image featuring the selected corner is rendered in the image rendering area 420 using a for-next loop for the number of calculated columns incremented by one using the distance of the starting left position plus the current for-next value multiplied by the bleedout width for each increment of the for-next loop. The top value does not change in this loop and a for-next loop inside of the column for-next loop for the number of calculated rows using a starting top position of zero and is incremented by one using the distance of the starting top position plus the current for-next value multiplied by the bleedout carpet design field image height for each increment of the for-next loop, the left value does not change in this loop. The amount of bleedout carpet design field image that is shown is calculated by multiplying the size times the dots per inch. As step 554, the coordinating border carpet design field is found and the image palette colors are changed to reflect the colors of the project palette 415.

At step 556 the corner position is located using the converted bleedout carpet design field amount minus the difference between then corner carpet design field height and the border carpet design field height divided by two which determines the top and the left of the corner carpet design field. The border carpet design field width and height are retrieved, and the number of image display columns is calculated by subtracting the width of the corner carpet design field and the calculated bleedout carpet design field amount from the rendering area width and dividing this value by the border carpet design field width and adding one to this value to compensate for integer calculation. The number of image display rows are calculated by subtracting the corner carpet design field height and the calculated bleedout amount from the rendering area height and dividing this value by the previous border carpet design field width and adding one to this value to compensate for integer calculation.

The border carpet design field image is rendered across the top in the image rendering area 420 using a starting position on the left by adding the corner carpet design field width and the calculated bleedout carpet design field amount and from the top by using the calculated bleedout carpet design field amount and using a for-next loop for the number of columns incremented by one using the distance of the starting left position plus the current for-next value multiplied by the border carpet design field width for each increment of the for-next loop, the top value does not change in this loop.

The border carpet design field image is rotated 90 degrees counter-clockwise and rendered down the left side of the image rendering area 420 using a starting position from the top by adding the calculated bleedout carpet design field amount and the corner carpet design field height and a starting position on the left of the calculated bleedout amount using a for-next loop for the number of rows incremented by one using the distance of the starting top position plus the current for-next value multiplied by the border width for each increment of the for-next loop. At step 558 the image is refreshed to display the changes in the image rendering area 420 and at step 559 is merged with previously customized carpet design fields 410.

If the field carpet design field image scaling factor is other than one, then the actual image sizes are retrieved for the field carpet design field pattern width and height and these values are multiplied by the field carpet design field image scale value, the number of image display columns are calculated by dividing the rendering image width minus the bleedout carpet design field amount plus the border carpet design field height by the scaled field carpet design field image width and one is added to this quantity to compensate for integer calculation and the number of image display rows are calculated by dividing the rendering image height minus the bleedout carpet design field amount plus the border carpet design field height by the scaled field carpet design field image height and one is added to this quantity to compensate for integer calculation. The image is scaled and is rendered in the image rendering area 420 using a starting left position of bleedout carpet design field amount plus the border carpet design field height and by using a for-next loop for the number of calculated columns incremented by one using the distance of the starting left position plus the current for-next value multiplied by the scaled field width for each increment of the for-next loop.

Figure 8:
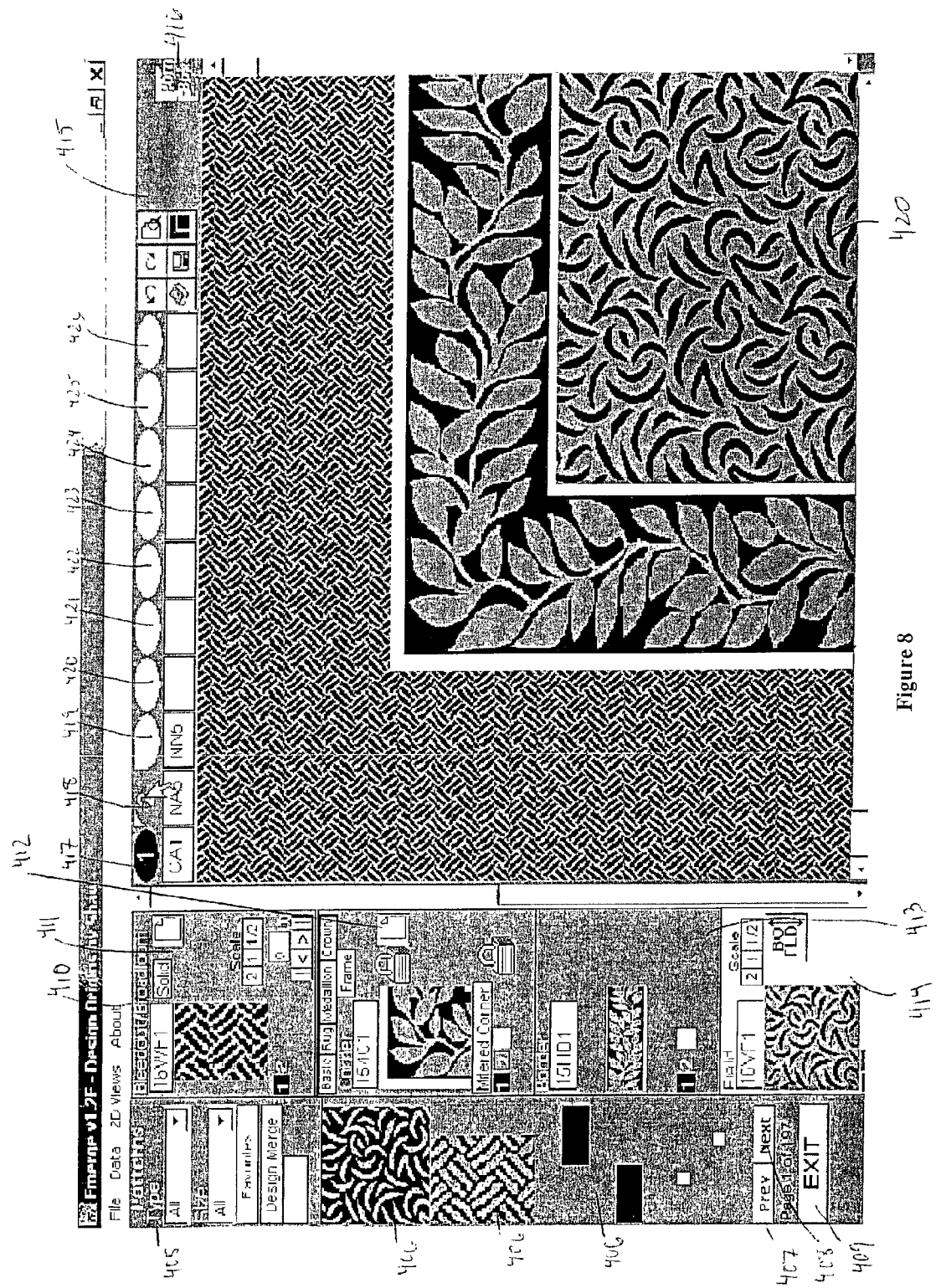
FIG. 8 illustrates selecting a field design pattern using the GUI.

The top value does not change in this loop and a for-next loop inside of the column for-next loop for the number of calculated rows using a starting top position of the bleedout carpet design field amount plus the border carpet design field height and is incremented by one using the distance of the starting top position plus the current for-next value multiplied by the scaled field height for each increment of the for-next loop, the left value does not change in this loop. Thereafter, at step 558 the image is refreshed to display the changes in the image rendering area 420 and at step 559 is merged with previously customized carpet design fields 410. FIG. 8 shows a graphical user interface display wherein a field for a custom-designed carpet has been selected to be customized by the user at step 553.

The user selects the field carpet design field from the carpet design field image area 410 of the graphical user interface, thereby making the field carpet design field image area the current image type that is to be customized. Next, the user scrolls through the images displayed in the pattern design pattern field 405 until the user finds a desirable pattern. The user then selects a design pattern in the design pattern field, and the design pattern becomes the current pattern of the selected carpet design field 410 image type. Further, the selected design pattern the pattern is displayed in the selected field carpet design field area of the carpet design field image area 410. The image palette colors of the field carpet design field are changed to reflect the colors of the project color palette 415. The actual design pattern image sizes are retrieved for the patterns and the number of image display columns are then calculated by dividing the rendering image width by the bleedout carpet design field image width and one is added to this quantity to compensate for integer calculation and the number of rows are calculated by dividing the rendering image height by the bleedout carpet design field image height and one is added to this quantity to compensate for integer calculation.

The image is rendered in the image rendering area 420 by using a for-next loop for the number of calculated columns and a for-next loop inside of the column for-next loop for the number of calculated rows. The image is refreshed to display the changes, wherein the amount of bleedout carpet design field shown is calculated by multiplying the size times the dots per inch. The coordinating border carpet design field is found and the border carpet design field image palette colors are changed to reflect the colors of the project palette 415. The corner carpet design field image position is located using the converted bleedout design field image amount for the top and left of the corner carpet design field image. The border carpet design field image width and height are retrieved and the number of image display columns is calculated by subtracting the corner carpet design field image width and the calculated bleedout carpet design field image amount from the rendering area width and dividing this value by the border carpet design field image width and adding one to this value to compensate for integer calculation.

The border carpet design field image is rotated 90 degrees counter-clockwise and the number of rows is calculated by subtracting the corner carpet design field image height and the calculated bleedout design field image amount from the rendering area height and dividing this value by the previous border carpet design field image width and adding one to this value to compensate for integer calculation. The border carpet design field image is rendered in the image rendering area 420 by using a for-next loop for the number of calculated columns, which renders the border across the top, and a for-next loop for the number of calculated rows, which renders the border down the left side. At step 558 the image is refreshed to display the merged changes.

Next, The field carpet design field information is determined. The number of image display columns are calculated by subtracting the border carpet design field width and the calculated bleedout carpet design field amount from the rendering area width and dividing this value by the field carpet design field width and adding one to this value to compensate for integer calculation and the number of rows are calculated by dividing the rendering image height by the border carpet design field image height plus the bleedout carpet design field image height and one is added to this quantity to compensate for integer calculation, then, at step 559, the image is rendered in the image rendering area 420 by using a for-next loop for the number of calculated columns and a for-next loop inside of the column for-next loop for the number of calculated rows. The image is refreshed to display the merged changes. The corner carpet design filed image position is located using the converted bleedout carpet design field amount for the corner top and corner left and the corner is displayed again to overlay field pattern in case the corner carpet design field is larger than the border carpet design field.

Figure 9:
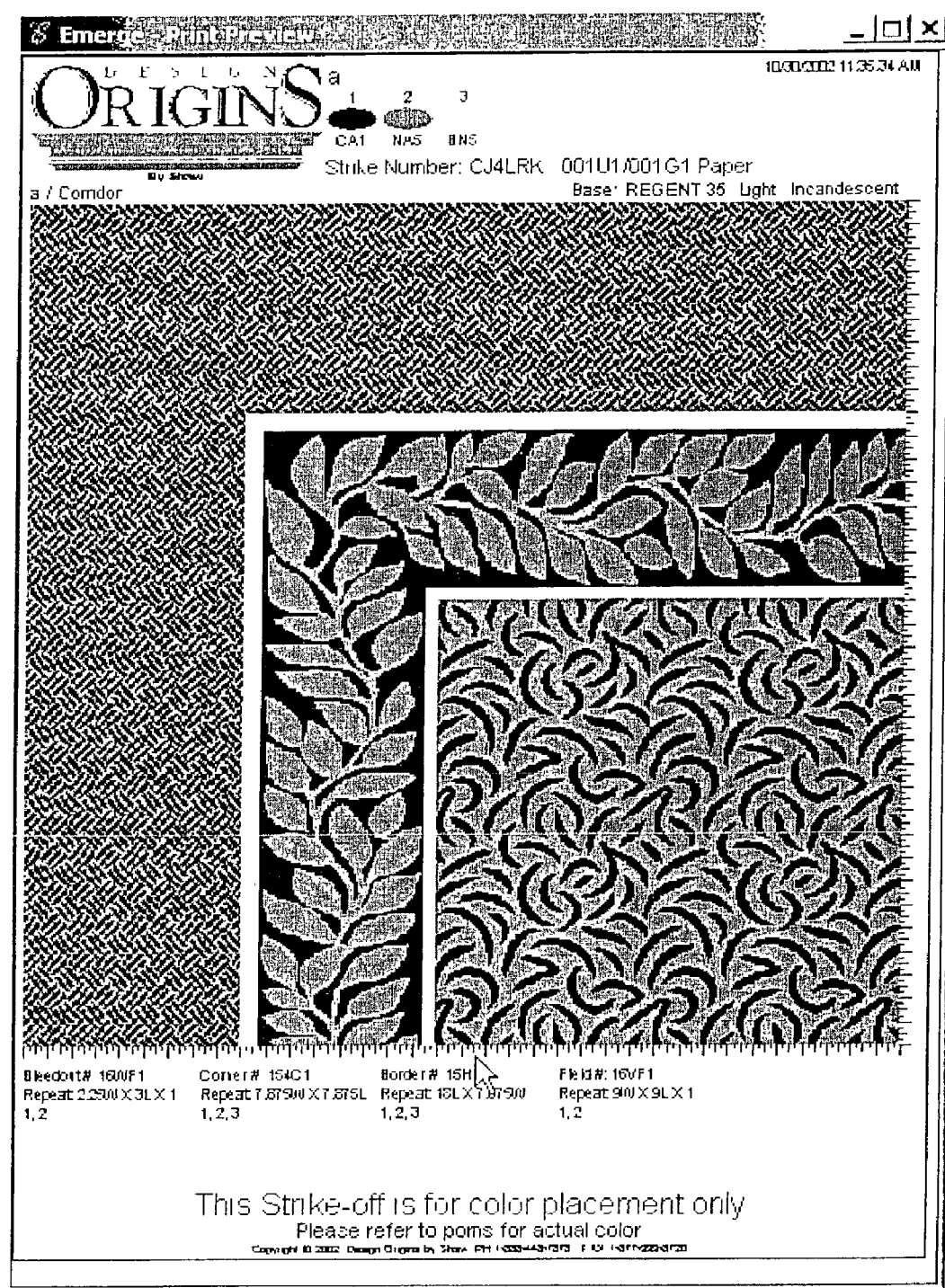
FIG. 9 illustrates a carpet strike-off image created using the present invention.

FIG. 9 is an electronic strike-off image of a custom-designed carpet that can be created from the custom-designed carpet image produced by the present invention. Although colors are not included in FIG. 9 (or any other drawing figure) as it appears in this patent specification, the strike-off is rendered in full color. The electronic strike-off can either be printed out at a printing device (not shown) or electronically transmitted to a third-party via the network 331, or saved to disk 326.

Figure 10:
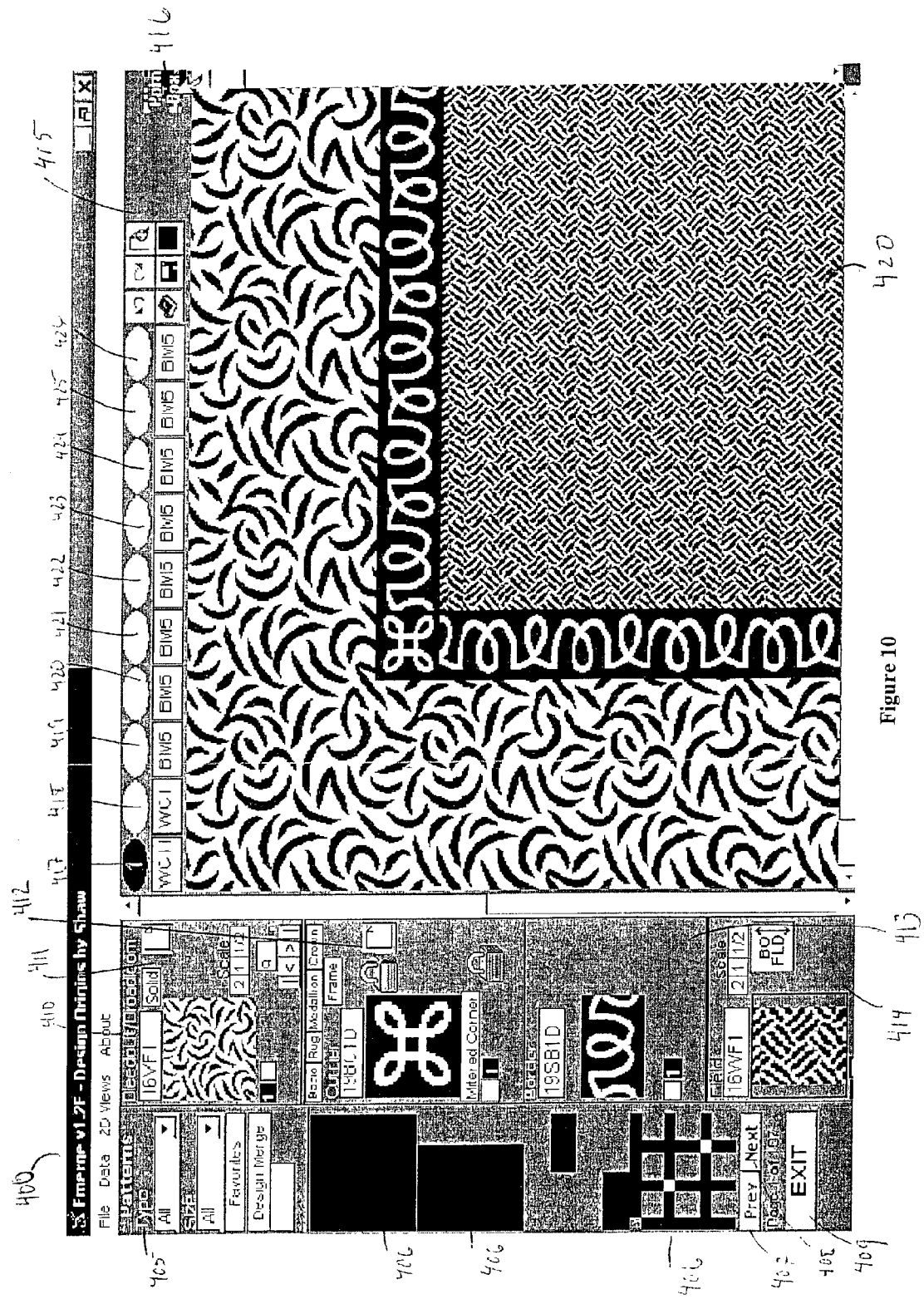
FIGS. 10, 10A and 10B illustrate examples of merged carpet design patterns created using the present invention.
Figure 10A:
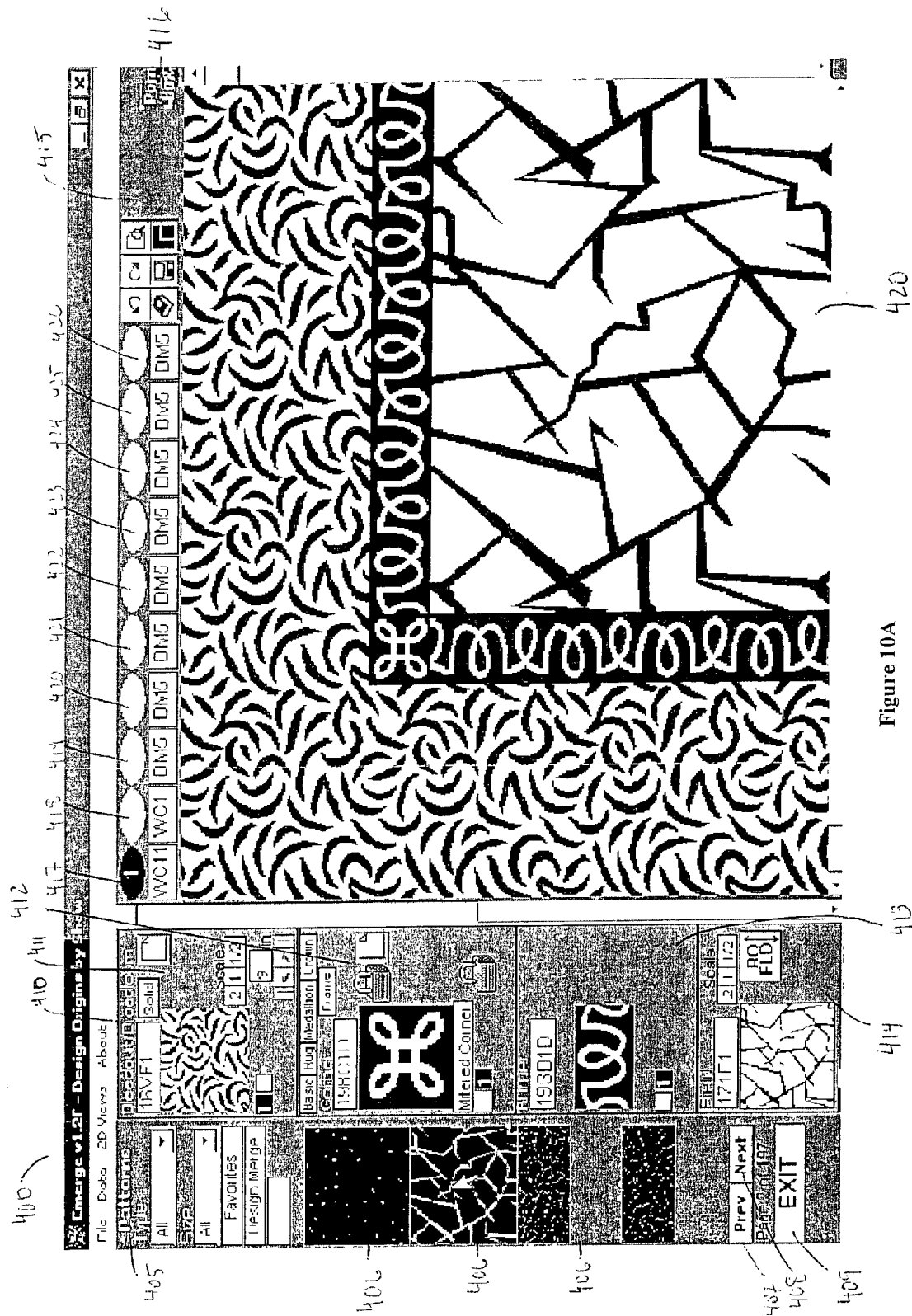
Figure 10B:
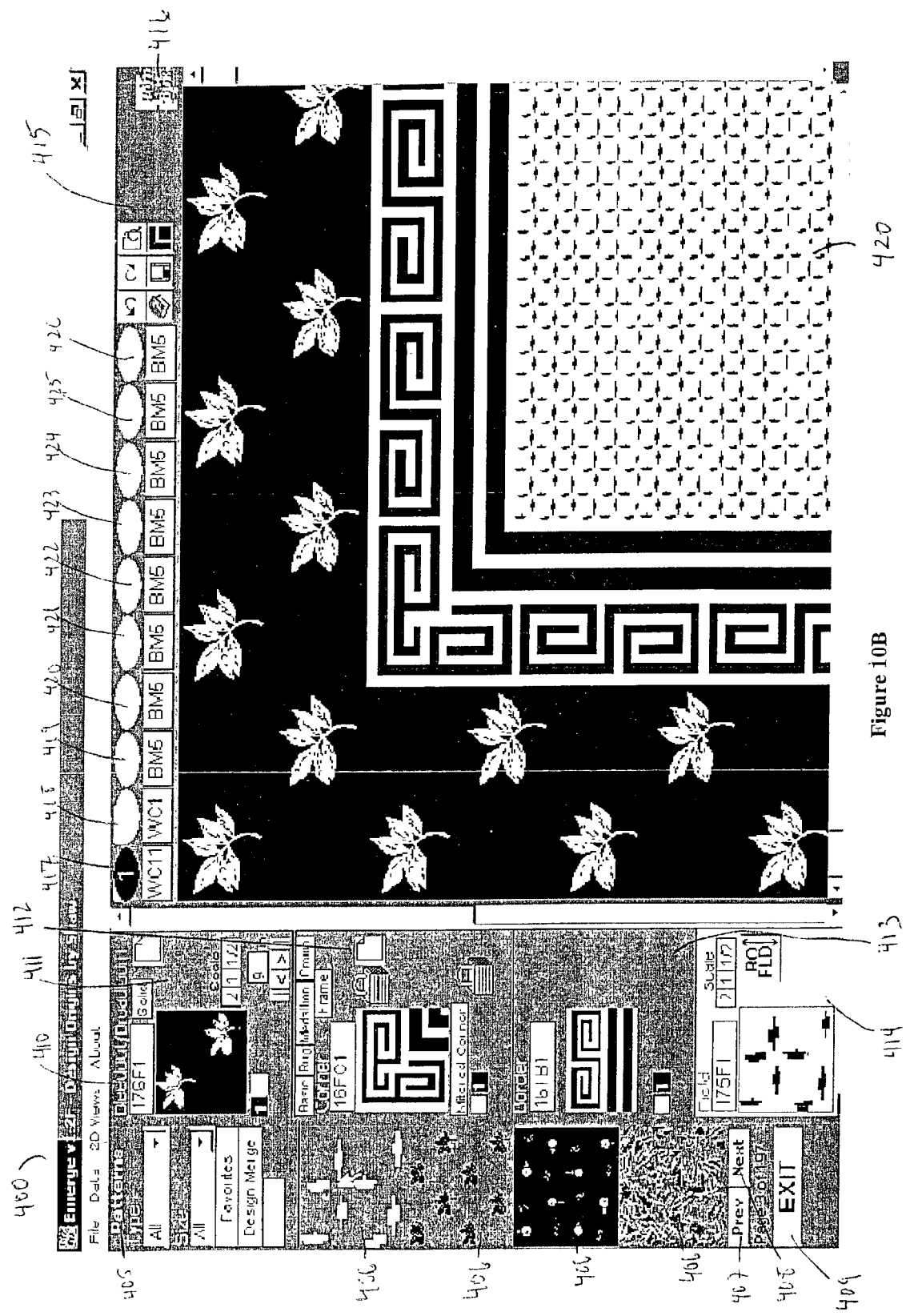

Further embodiments of custom-designed carpets are shown in FIGS. 10, 10A and 10B, which are intended to illustrate the customization-designing flexibilities of the present invention by showcasing various patterns and design effects.

Figure 11:
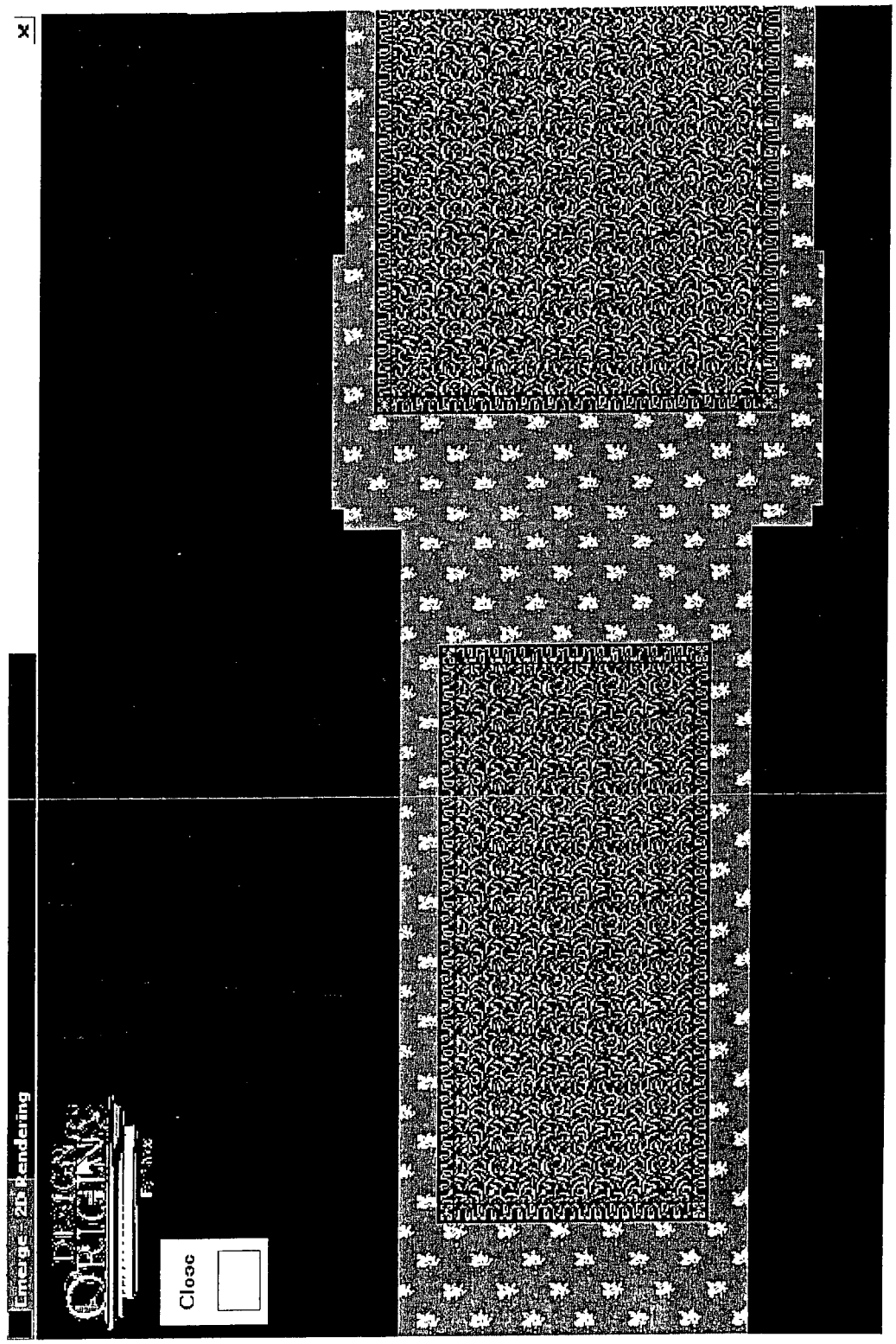
FIGS. 11, 11A and 11B illustrate two-dimensional carpet models that can be selected within the present invention.
Figure 11A:
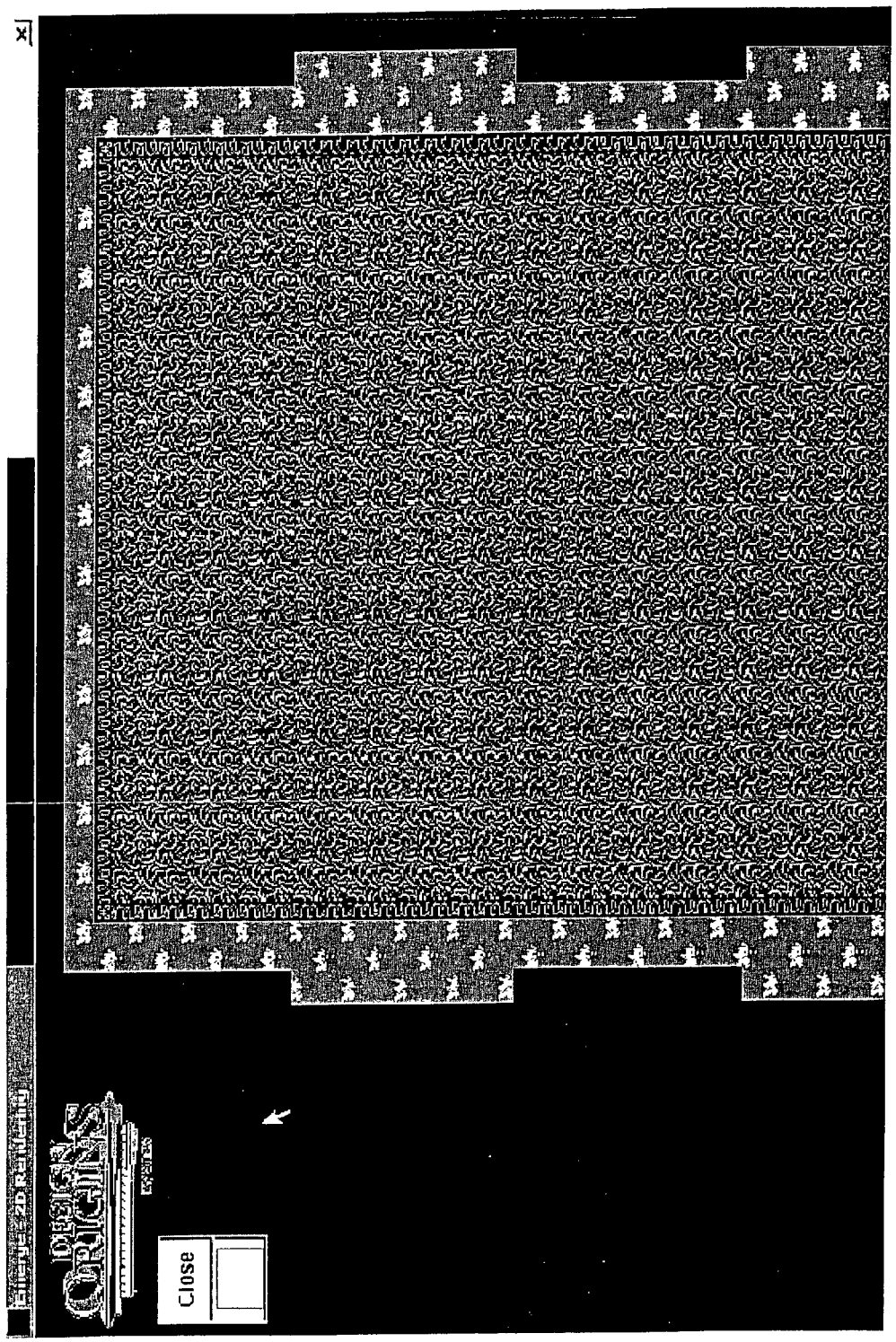
Figure 11B:
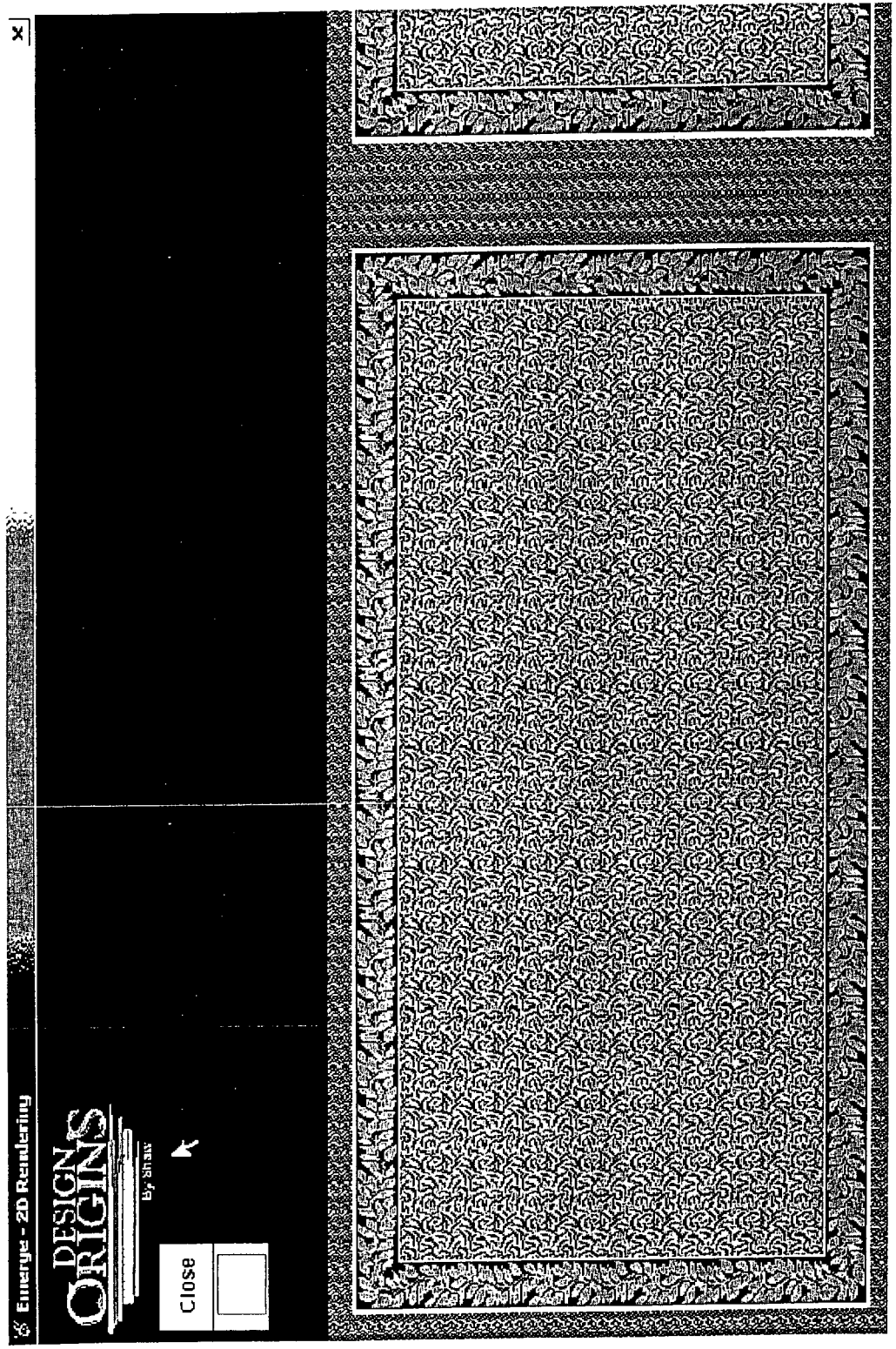

A further exemplary aspect of the above-described invention allows for a user to select a carpet shape from a plurality of predetermined carpet shapes that are accessible to the user by way of the graphical user interface. As shown in FIGS. 11, 11A and 11B, a user may customize and display an image of the custom-designed carpet that conform to a selected carpet shape. A yet further aspect allows a user to input dimensional specifications that define a custom carpet shape and display the image of the custom-designed carpet in the defined custom carpet shape.

Other aspects of the present invention may be found from the attached drawings and other related materials such as a detailed review of the various functions offered by the present invention, which are integral parts of this disclosure. Moreover, other embodiments of the invention will be apparent to those skilled in the art from consideration of the specification and practice of the invention disclosed herein. It is intended that the specification and examples be considered as exemplary only.

What is claimed:

1. A method for designing a custom carpet comprising:
   a. receiving a resolution and a scaling factor;
   b. receiving a plurality of colors for a project color palette wherein the project color palette indicates a common color scheme to be used for a carpet design that comprises multiple design patterns;
   c. receiving a selection of a plurality of carpet design fields, wherein the plurality of carpet design fields together comprise a single carpet;
   d. providing a collection of design patterns applicable to the selected plurality of carpet design fields, wherein each design pattern has an associated design pattern color palette representing a color scheme associated with the design pattern;
   e. receiving a selection of a plurality of the collection of design patterns;
   f. applying the selected plurality of the collection of design patterns to respective selected plurality of carpet design fields resulting in each of the plurality of carpet design fields having an associated design pattern, wherein the selected plurality of the collection of design patterns is scaled according to the scaling factor;
   g. changing the design pattern color palettes associated with the selected plurality of the collection of design patterns to reflect the plurality of colors of the project color palette, thereby changing at least one color of the selected plurality of the collection of design patterns; and
   h. rendering an image of the custom carpet comprising each of the associated design patterns of respective selected plurality of carpet design fields, wherein said image is rendered according to the received resolution and the changed design pattern color palette.

2. The method of claim 1, further comprising creating a strike-off image.

3. The method of claim 1, wherein the selected carpet design field is a bleedout design pattern.

4. The method of claim 3, further comprising determining an amount of bleedout.

5. The method of claim 4, wherein rendering an image of the carpet design field further comprises adjusting a height and a width of the bleedout design pattern according to the scaling factor.

6. The method of claim 1, wherein the selected carpet design field is a corner design field.

7. The method of claim 6, wherein rendering an image of the carpet design field further comprises adjusting a height and a width of a corner design pattern according to a previously determined bleedout design pattern height and width.

8. The method of claim 1, wherein the selected carpet design field is a border design field.

9. The method of claim 8, wherein rendering an image of the carpet design field further comprises adjusting a height and a width of a border design pattern according to a previously determined corner design pattern height and width and a previously determined bleedout design pattern height and width.

10. The method of claim 1, wherein the selected carpet design field is a field design field.

11. The method of claim 10, wherein rendering an image of the carpet design field further comprises adjusting a height and a width of a field design pattern according to a previously determined corner design pattern height and width and a previously determined bleedout design pattern height and width.

12. The method of claim 1, wherein the plurality of carpet design fields comprises a bleedout design field, a corner design field, a border design field, and a field carpet design field.

13. A computer system for designing a carpet comprising a processing system having one or more processing elements that are programmed or adapted to:
   a. receive a resolution and a scaling factor;
   b. receive a plurality of colors for a project color palette wherein the project color palette indicates a common color scheme to be used for a carpet design that comprises multiple design patterns;
   c. receive a selection of a plurality of carpet design fields, wherein the plurality of carpet design fields together comprise a single carpet;
   d. provide a collection of design patterns applicable to the selected plurality of carpet design fields, wherein each design pattern has an associated design pattern color palette representing a color scheme associated with the design pattern;
   e. receive a selection of a plurality of the collection of design patterns;
   f. apply the selected plurality of the collection of design patterns to respective selected plurality of carpet design fields resulting in each of the plurality of carpet design fields having an associated design pattern, wherein the selected plurality of the collection of design patterns is scaled according to the scaling factor;
   g. change the design pattern color palettes associated with the selected plurality of the collection of design patterns to reflect the plurality of colors of the project color palette, thereby changing at least one color of the selected plurality of the collection of design patterns; and
   h. render an image of the custom carpet comprising each of the associated design patterns of respective selected plurality of carpet design fields, wherein said image is rendered according to the received resolution and the changed design pattern color palette.

14. The computer system of claim 13, further programmed or adapted to create a strike-off image.

15. The computer system of claim 13, wherein the selected carpet design field is a bleedout design pattern.

16. The computer system of claim 15, further programmed or adapted to determine an amount of bleedout.

17. The computer system of claim 16, wherein rendering an image of the carpet design field further comprises adjusting a height and a width of the bleedout design pattern according to the scaling factor.

18. The computer system of claim 13, wherein the selected carpet design field is a corner design field.

19. The computer system of claim 18, wherein rendering an image of the carpet design field further comprises adjusting a height and a width of a corner design pattern according to a previously determined bleedout design pattern height and width.

20. The computer system of claim 13, wherein the selected carpet design field is a border design field.

21. The computer system of claim 20, wherein rendering an image of the carpet design field further comprises adjusting a height and a width of a border design pattern according to a previously determined corner design pattern height and width and a previously determined bleedout design pattern height and width.

22. The computer system of claim 13, wherein the selected carpet design field is a field design field.

23. The computer system of claim 22, wherein rendering an image of the carpet design field further comprises adjusting a height and a width of a field design pattern according to a previously determined corner design pattern height and width and a previously determined bleedout design pattern height and width.

24. The computer system of claim 13, wherein the plurality of carpet design fields comprises a bleedout design field, a corner design field, a border design field, and a field carpet design field.

25. A computer program product for designing a carpet embodied on a computer-readable medium and comprising code that, when executed, causes a computer to perform the following:
   a. receive a resolution and a scaling factor;
   b. receive a plurality of colors for a project color palette wherein the project color palette indicates a common color scheme to be used for a carpet design that comprises multiple design patterns;
   c. receive a selection of a plurality of carpet design fields, wherein the plurality of carpet design fields together comprise a single carpet;
   d. provide a collection of design patterns applicable to the selected plurality of carpet design fields, wherein each design pattern has an associated design pattern color palette representing a color scheme associated with the design pattern;
   e. receive a selection of a plurality of the collection of design patterns;
   f. apply the selected plurality of the collection of design patterns to respective selected plurality of carpet design fields resulting in each of the plurality of carpet design fields having an associated design pattern, wherein the selected plurality of the collection of design patterns is scaled according to the scaling factor;
   g. change the design pattern color palettes associated with the selected plurality of the collection of design patterns to reflect the plurality of colors of the project color palette, thereby changing at least one color of the selected plurality of the collection of design patterns; and
   h. render an image of the custom carpet comprising each of the associated design patterns of respective selected plurality of carpet design fields, wherein said image is rendered according to the received resolution and the changed design pattern color palette.

26. The method of claim 1, wherein the plurality of carpet design fields is selected from the group consisting of: a bleedout design field, a corner design field, a border design field, and a field carpet design field.

27. The system of claim 13, wherein the plurality of carpet design fields is selected from the group consisting of: a bleedout design field, a corner design field, a border design field, and a field carpet design field.

28. A computer system for designing a carpet comprising a processing system having one or more processing elements that are programmed or adapted to:
  a. receive a resolution and a scaling factor;
  b. receive a plurality of colors for a project color palette wherein the project color palette indicates a common color scheme to be used for a carpet design that comprises multiple design patterns;
  c. receive a selection of a plurality of carpet design fields, wherein the plurality of carpet design fields together comprise a single carpet, and wherein the plurality of carpet design fields is at least one of, a bleedout design field, a corner design field, a border design field, and a field carpet design field;
  d. provide a collection of design patterns applicable to the selected plurality of carpet design fields, wherein each design pattern has an associated design pattern color palette representing a color scheme associated with the design pattern;
  e. receive a selection of a plurality of the collection of design patterns;
  f. apply the selected plurality of the collection of design patterns to respective selected plurality of carpet design fields resulting in each of the plurality of carpet design fields having an associated design pattern, wherein the selected plurality of the collection of design patterns is scaled according to the scaling factor;
  g. change the design pattern color palettes associated with the selected plurality of the collection of design patterns to reflect the plurality of colors of the project color palette, thereby changing at least one color of the selected plurality of the collection of design patterns; and
  h. render an image of the custom carpet comprising each of the associated design patterns of respective selected plurality of carpet design fields, wherein said image is rendered according to the received resolution and the changed design pattern color palette.

* * * * *